(12) United States Patent
Imamura

(10) Patent No.: US 10,038,804 B2
(45) Date of Patent: Jul. 31, 2018

(54) IMAGE FORMING APPARATUS, CONTROL METHOD OF IMAGE FORMING APPARATUS AND, PROGRAM

(71) Applicant: CANON KABUSHIKI KAISHA, Tokyo (JP)

(72) Inventor: Takeru Imamura, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/409,041

(22) Filed: Jan. 18, 2017

(65) Prior Publication Data

US 2017/0134600 A1 May 11, 2017

Related U.S. Application Data

(63) Continuation of application No. 14/843,816, filed on Sep. 2, 2015, which is a continuation of application (Continued)

(30) Foreign Application Priority Data

Jun. 21, 2013 (JP) ................................ 2013-131104

(51) Int. Cl.
*H04N 1/00* (2006.01)
*G06K 15/00* (2006.01)
*G03G 15/00* (2006.01)

(52) U.S. Cl.
CPC ..... *H04N 1/00896* (2013.01); *G03G 15/5004* (2013.01); *G06K 15/4055* (2013.01); (Continued)

(58) Field of Classification Search
USPC ................................. 358/1.13, 1.14
See application file for complete search history.

(56) References Cited

U.S. PATENT DOCUMENTS

| 2009/0313493 A1* | 12/2009 | Ide ................. G06F 1/3203 713/323 |
| 2013/0128298 A1* | 5/2013 | Yamada ................. G06K 15/02 358/1.13 |
| 2014/0063528 A1* | 3/2014 | Hirose ................. H04N 1/00323 358/1.13 |

FOREIGN PATENT DOCUMENTS

| CN | 102065195 A | 5/2011 |
| CN | 102480579 A | 5/2012 |

(Continued)

*Primary Examiner* — Ngon Nguyen
(74) *Attorney, Agent, or Firm* — Canon U.S.A., Inc. IP Division

(57) ABSTRACT

An image forming apparatus includes: an accepting unit to accept user operations to transition the apparatus from a standby state to a power save state; a detecting unit to detect objects around the apparatus; and a power control unit to transition the apparatus from the power save state to the standby state according to detection of an object by the detecting unit, and to transition the image forming apparatus from the standby state to the power save state according to user operations accepted at the accepting unit. The power control unit prohibits the apparatus from transitioning from the power save state to the standby state according to the detection of the object, until a user, which performed operations accepted by the accepting unit to transition the apparatus from the standby state to the power save state, thereafter ceases to be detected by the detecting unit.

24 Claims, 19 Drawing Sheets

Related U.S. Application Data

No. 14/307,989, filed on Jun. 18, 2014, now Pat. No. 9,148,542.

(52) U.S. Cl.
CPC ..... *H04N 1/00037* (2013.01); *H04N 1/00082* (2013.01); *H04N 1/00891* (2013.01); *H04N 1/00925* (2013.01); *H04N 2201/0094* (2013.01)

(56) References Cited

FOREIGN PATENT DOCUMENTS

| | | |
|---|---|---|
| CN | 102710880 A | 10/2012 |
| CN | 102984413 A | 3/2013 |
| JP | 2002-229395 A | 8/2002 |
| JP | 2012-058645 A | 3/2012 |
| JP | 2012203132 A | 10/2012 |
| JP | 2012247799 A | 12/2012 |
| JP | 2013-054320 A | 3/2013 |

\* cited by examiner

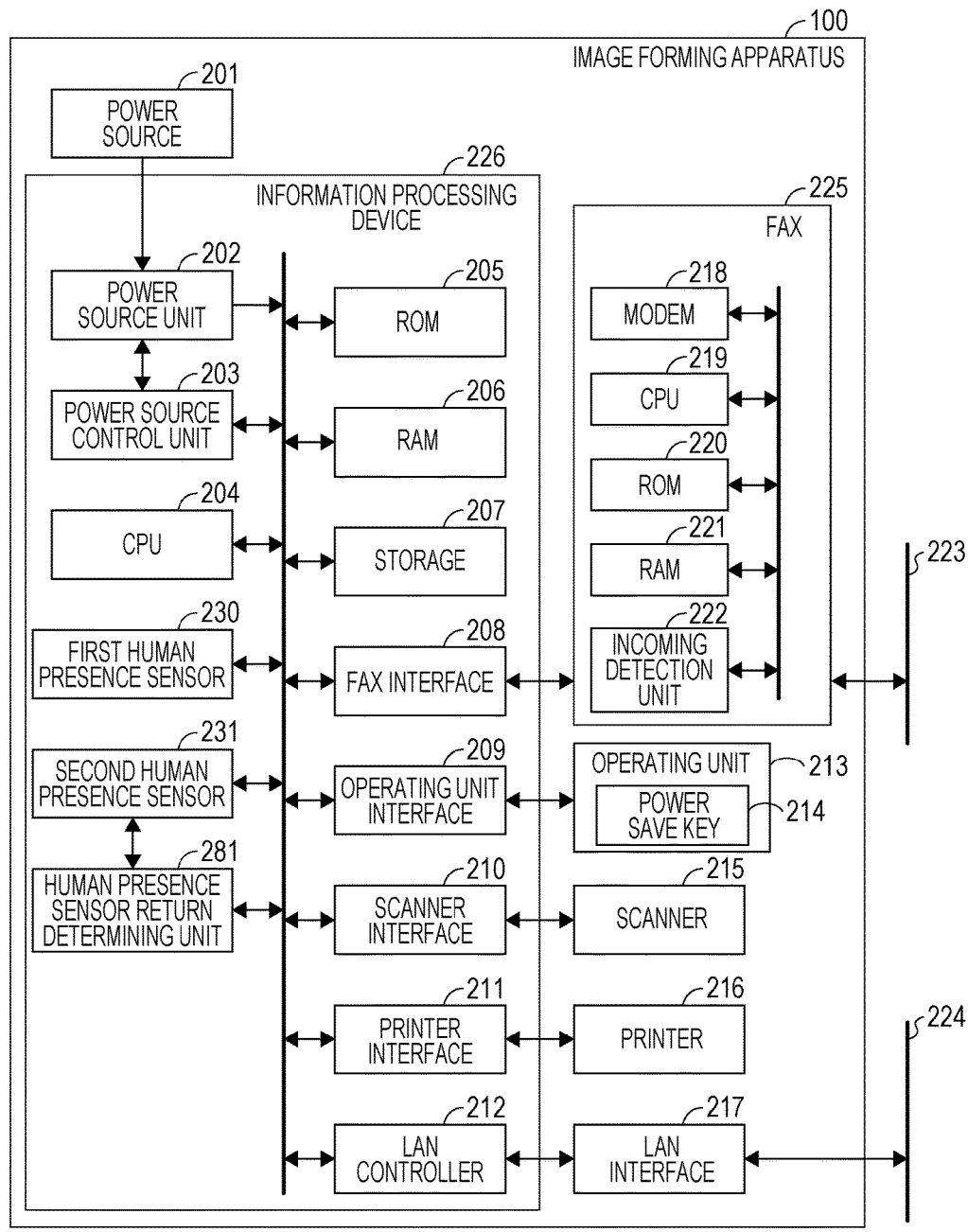

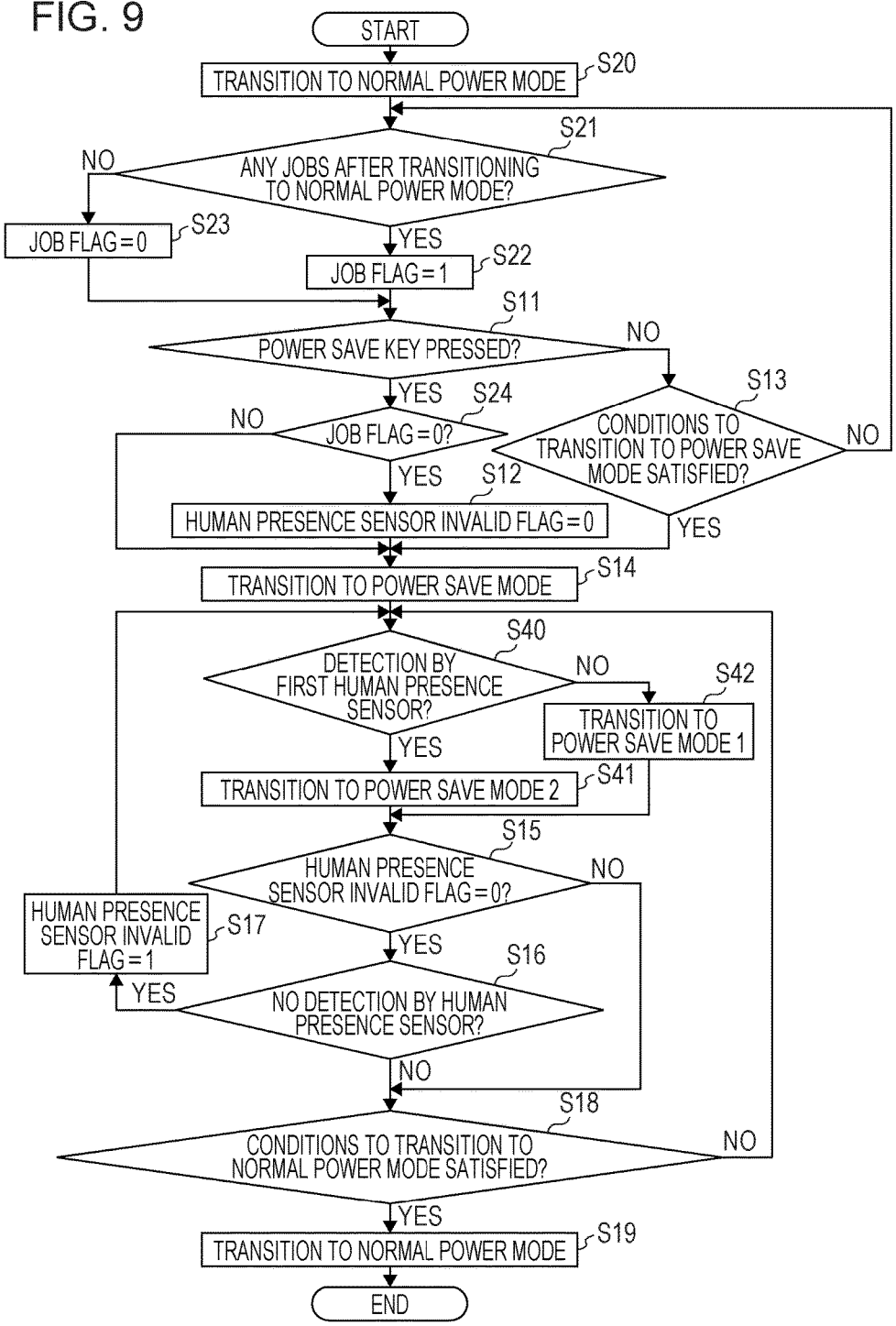

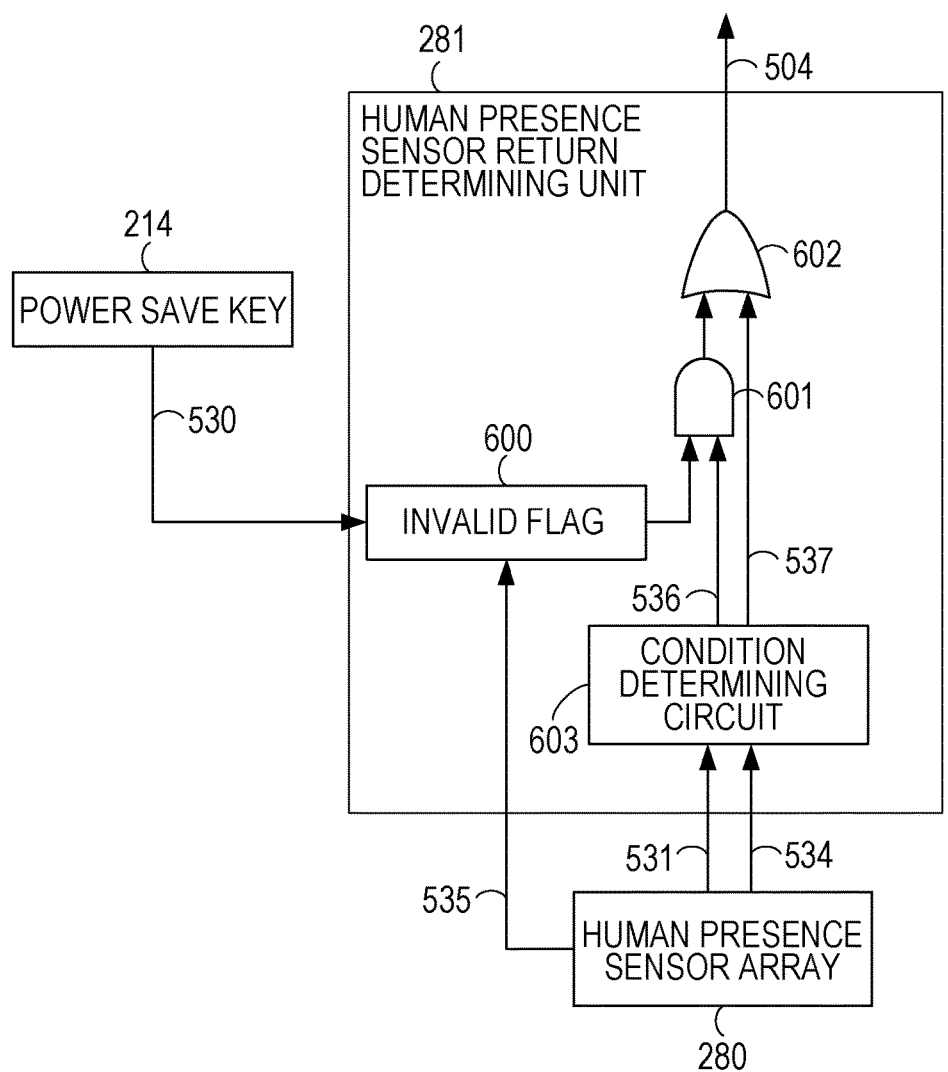

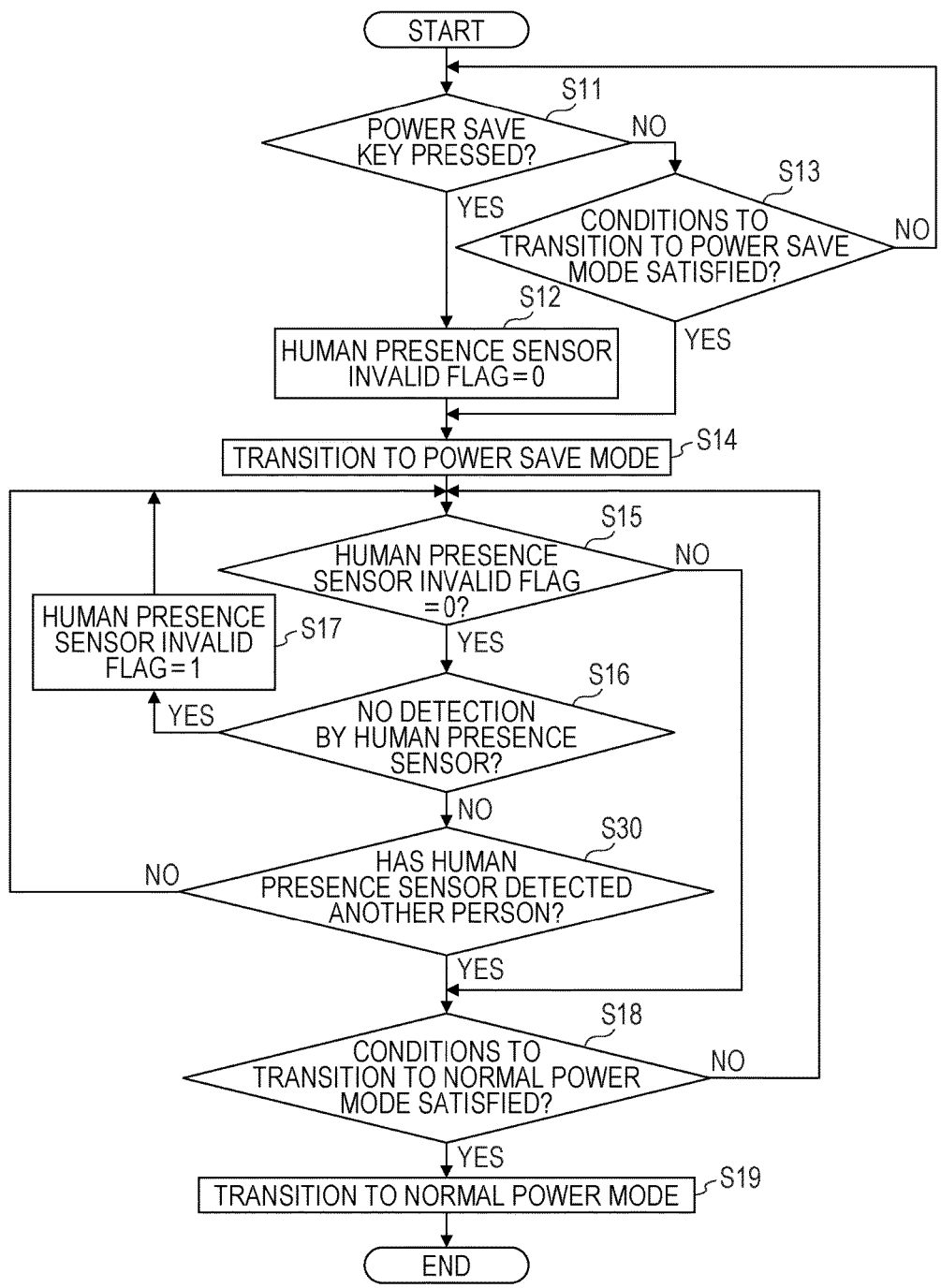

IMAGE FORMING APPARATUS, CONTROL METHOD OF IMAGE FORMING APPARATUS AND, PROGRAM

CROSS-REFERENCE TO RELATED APPLICATION

This application is a Continuation of U.S. application Ser. No. 14/843,816, filed Sep. 2, 2015, which is a Continuation of U.S. application Ser. No. 14/307,989, filed Jun. 18, 2014, which now becomes U.S. Pat. No. 9,148,542, issued Sep. 29, 2015, which claims priority from Japanese Patent Application No 2013-131104 filed Jun. 21, 2013, which is hereby incorporated by reference herein in its entirety.

BACKGROUND OF THE INVENTION

Field of the Invention

One disclosed aspect of the embodiments relates to power mode switching of an image forming apparatus using human presence detection technology.

Description of the Related Art

Conventional image processing apparatuses have multiple power modes, and support a power save mode where power within the apparatus is disconnected depending on the power mode. However, return from the power save mode to a normal power mode may take time, reducing convenience.

Japanese Patent Laid-Open No. 2012-58645 discloses solving this problem by using a human presence sensor to return from the conventional power save mode, so that in a case where determination is made that a person is approaching the apparatus, the apparatus returns from the power save mode.

There also is an image processing apparatus provided with a power save key to be pressed by user operations, disclosed in Japanese Patent Laid-Open No. 2002-229395. Upon the power save key being pressed, the image forming apparatus transitions to power save mode.

However, in the art of Japanese Patent Laid-Open No. 2012-58645 and Japanese Patent Laid-Open No. 2002-229395, there may be cases where the power save key is pressed, instructing the image forming apparatus to transition to the power save mode, while the human presence sensor is detecting human presence. In this case, the image forming apparatus transitions to the power save mode since the power save key has been pressed, but the user in front of the image forming apparatus who has pressed the power save key is detected by the human presence sensor. Accordingly, there has been a problem in which the image forming apparatus returns to normal power mode even though the power save key has been pressed, so power conservation is not realized.

SUMMARY OF THE INVENTION

An image forming apparatus, having at least a standby state, and a power save state which consumes less power than the standby state, the image forming apparatus includes: an accepting unit configured to accept user operations to transition the image forming apparatus from the standby state to the power save state; a detecting unit configured to detect objects around the image forming apparatus; and a power control unit configured to transition the image forming apparatus from the power save state to the standby state in accordance with detection of an object by the detecting unit, and to transition the image forming apparatus from the standby state to the power save state in accordance with user operations accepted at the accepting unit. The power control unit prohibits the image forming apparatus from transitioning from the power save state to the standby state in accordance with detection of an object by the detecting unit, until a user, which has performed operations accepted by the accepting unit to transition the image forming apparatus from the standby state to the power save state, thereafter ceases to be detected by the detecting unit.

Further features of the disclosure will become apparent from the following description of exemplary embodiments with reference to the attached drawings.

BRIEF DESCRIPTION OF THE DRAWINGS

FIGS. 3A through 3C are diagrams illustrating examples of the hardware configuration of the image forming apparatus according to the first embodiment.

FIG. 9 is a flowchart illustrating an example of power mode transition operations according to the second embodiment.

FIG. 15 is a diagram illustrating an example of the configuration of a human presence sensor array determination unit according to the third embodiment.

FIG. 16 is a flowchart illustrating an example of power mode transition operations according to the third embodiment.

DESCRIPTION OF THE EMBODIMENTS

Embodiments to carry out the present embodiment will be described with reference to the drawings. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, etc. One embodiment may be described by a schematic drawing depicting a physical structure. It is understood that the schematic drawing illustrates the basic concept and may not be scaled or depict the structure in exact proportions.

It has been found desirable to provide a mechanism by which unnecessary return from the power save state, due to detection by the human presence sensor after the power save key has been pressed, can be prevented.

First Embodiment

Figure 1A:
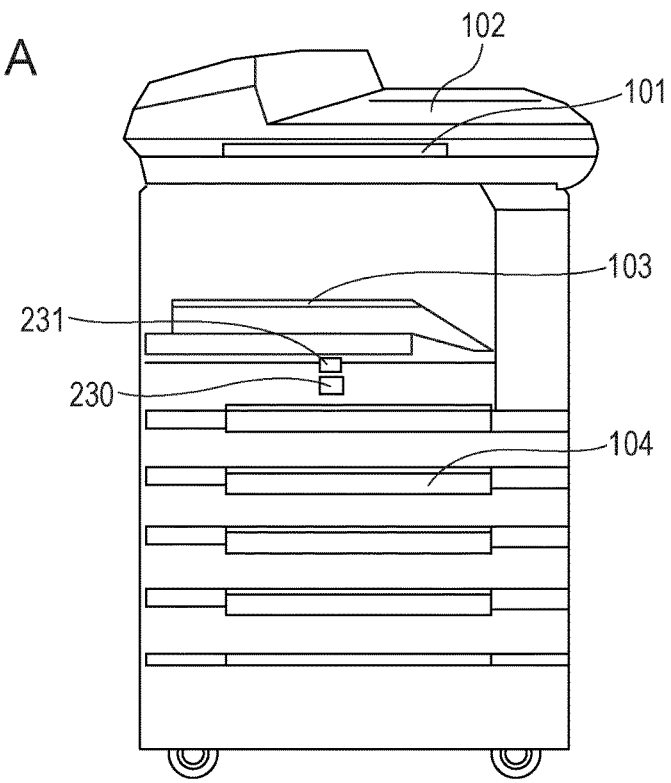
FIGS. 1A and 1B are diagrams illustrating an example of the configuration of an image forming apparatus representing an electronic device according to a first embodiment.
Figure 1B:
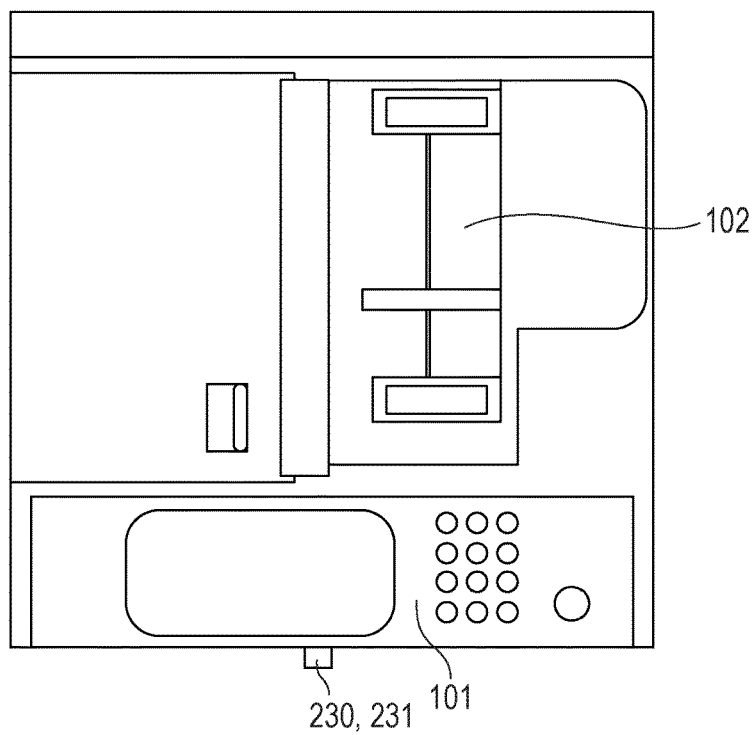

FIGS. 1A and 1B are diagrams illustrating an example of the configuration of an image forming apparatus representing an electronic device according to a first embodiment. FIG. 1A corresponds to a front view of the image forming apparatus, and FIG. 1B corresponds to a top view of the image forming apparatus.

Reference numeral 100 denotes the image forming apparatus representing the electronic device. The image forming apparatus 100 includes an operating unit 101, scanner 102, built-in finisher 103, feed cassette 104, and so forth, and functions such as copy, print, facsimile, scan, and so forth.

The image forming apparatus 100 has a normal power mode, a second power save mode which consumes less power (e.g., electrical power) than the normal power mode, and a first power save mode which consumes less power (e.g., electrical power) than the second power save mode, and can be switched to any of these modes. The power state of the image forming apparatus 100 in the normal power mode, first power save mode, and second power save mode, will be referred to as first power state, second power state, and third power state, respectively. The image forming apparatus 100 is an image forming apparatus which can operate by switching between at least the first power state and second power state.

The image forming apparatus 100 includes a first human presence sensor 230 which operates in a first power save mode, and a second human presence sensor 231 which operates in a second power save mode. The first human presence sensor 230 and second human presence sensor 231 use sensors to detect objects, such as pyroelectric sensors or reflection sensors.

Figure 2A:
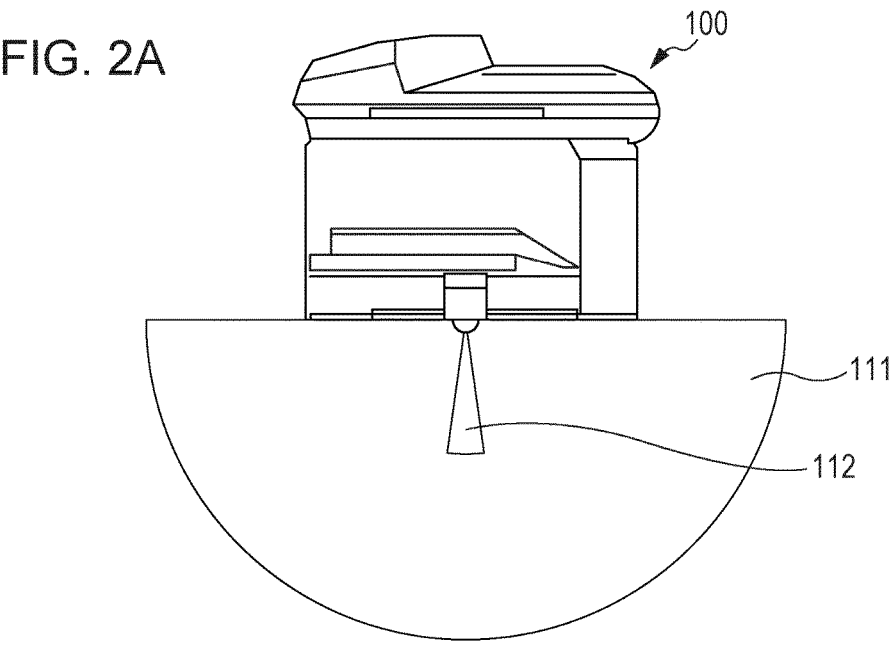
FIGS. 2A and 2B are diagrams illustrating examples of detection ranges of a first human presence sensor and a second human presence sensor.
Figure 2B:
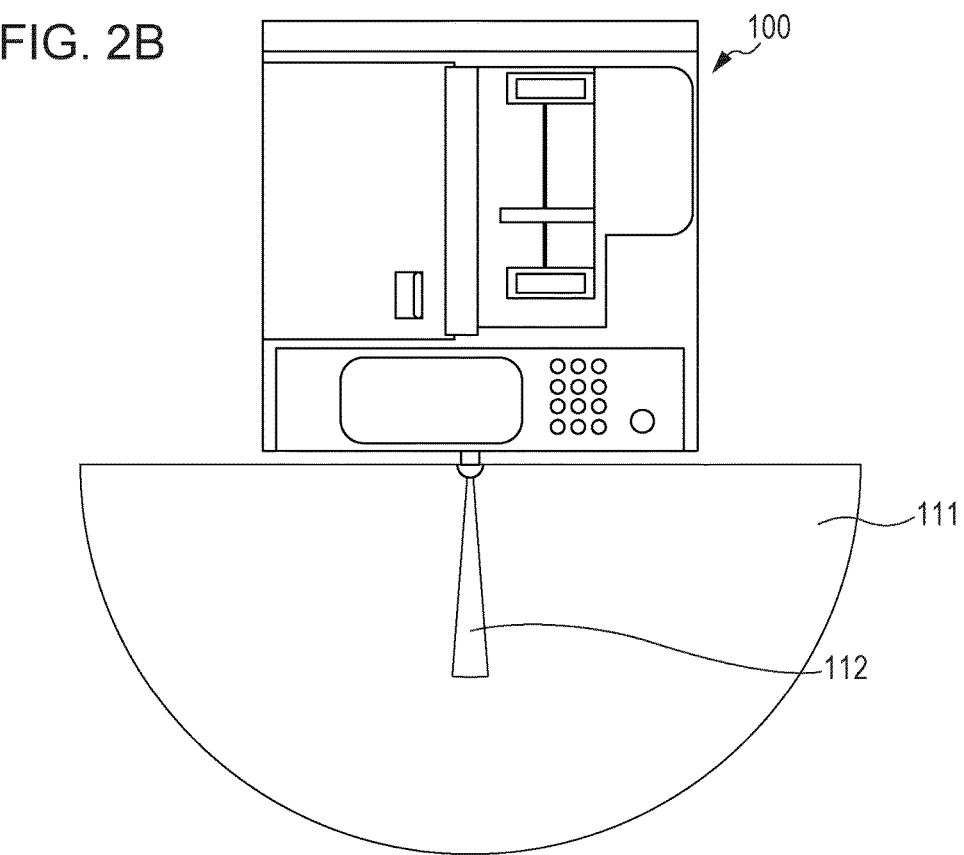

The first human presence sensor 230 is a first detecting unit which detects people approaching the image forming apparatus 100 over a wide range, and is configured using a pyroelectric sensor for example, to detect objects such as human bodies. The second human presence sensor 231 is a second detecting unit which detects people approaching the image forming apparatus 100 in a narrower range than the first human presence sensor 230, and is configured using a reflection sensor for example, to detect objects such as human bodies. FIGS. 2A and 2B illustrate examples of the detecting ranges of the first human presence sensor 230 and second human presence sensor 231.

FIGS. 2A and 2B are diagrams illustrating examples of the detection ranges of the first human presence sensor 230 and second human presence sensor 231. FIG. 2A corresponds to a front view of the image forming apparatus 100, and FIG. 2B corresponds to a top view of the image forming apparatus 100. In FIGS. 2A and 2B, reference numeral 111 indicates the detection range of the first human presence sensor 230, while reference numeral 112 indicates the detection range of the second human presence sensor 231.

FIG. 3A is a block diagram illustrating an example of the hardware configuration of the image forming apparatus 100 according to the first embodiment.

An information processing device 226 is connected to a local area network (LAN) 224 via a LAN interface 217, and also is connected to a telephone line 223 via a FAX 225.

A central processing unit (CPU) 204 executes software programs to control the overall information processing device 226. Random access memory (RAM) 206 is used to temporarily store data at the time of the CPU 204 controlling the device. Read only memory (ROM) 205 stores programs which the CPU executes such as a start-up program for the device, various types of settings, and so forth. Storage 207 is a storage device such as a hard disk drive (HDD), solid state drive (SSD), or the like, and is used to store various types of data.

An operating unit interface 209 controls an operating unit 213 under control of the CPU 204. The operating unit 213 includes a liquid crystal panel having a touch panel for performing operations, hard keys including a power save key 214, to accept instructions input from users.

A scanner interface 210 controls a scanner 215 under control of the CPU 204. The scanner 215 reads images of original documents placed on a document positioning plate or run through an auto document feeder (ADF), and generates images. A printer interface 211 controls a printer 216 under control of the CPU 204. The printer 216 prints images based on image data, onto paper.

A FAX interface 208 controls the FAX 225 under control of the CPU 204. The FAX 225 includes a modem 218, CPU 219, RAM 221, ROM 220, and an incoming detection unit 222. The image forming apparatus 100 controls data communication with external devices connected over the telephone line 223. A modem 218 performs modulation for transmission/reception by the FAX 225. The CPU 219 controls transmission/reception of the FAX 225 in coordination with the information processing device 226 via the FAX interface 208. The RAM 221 is used to temporarily store data at the time of the CPU 219 controlling the device. The ROM 220 stores programs such as a start-up program for the FAX 225, various types of setting values, and so forth. The functions of the CPU 219, RAM 221, and ROM 220, of the FAX 225, may be included within the information processing device 226.

A LAN controller 212 controls the LAN interface 217 under control of the CPU 204. The image forming apparatus 100 controls data communication with external devices connected to a network 224.

A power source control unit 203 has a power control function to control power supplied from a power source unit 202 to wherever necessary. In the normal power mode, power is supplied to all blocks, as illustrated in FIG. 3A. An arrangement may be made where power is supplied only to necessary functions at this time, but this arrangement will not be described here.

Figure 3B:
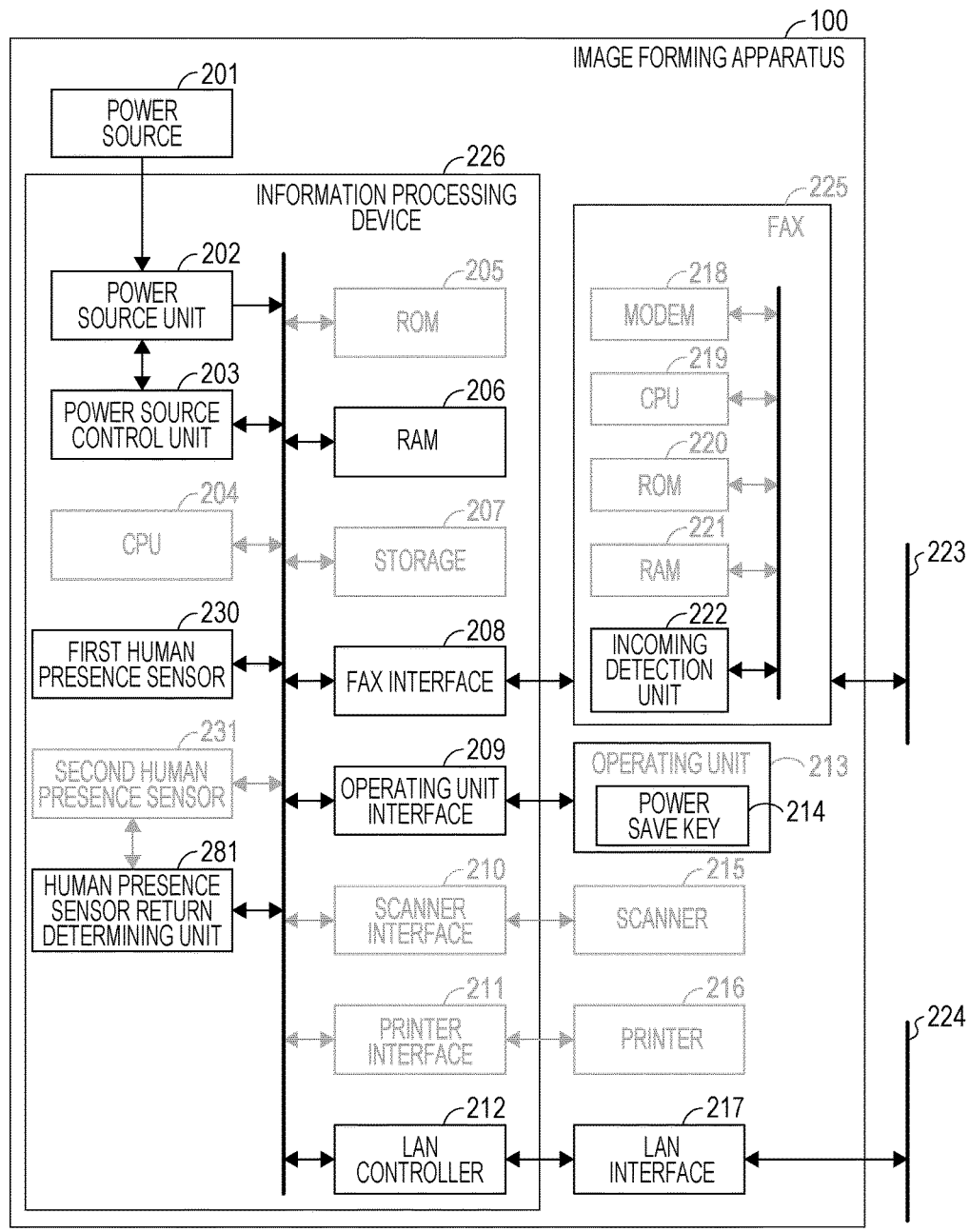

In the first power save mode, power is not supplied to a part of the blocks, as illustrated in FIG. 3B. The grayed out portions in FIG. 3B indicate that power is not being supplied thereto. The power supply state in the first power save mode will now be described.

First, power is supplied to the power source unit 202 from the power source 201. The blocks to which power is supplied from the power source unit 202 are the RAM 206, the first human presence sensor 230, a human presence sensor return determining unit 281, the FAX interface 208, the incoming detection unit 222, the power save key 214, the operating unit interface 209, the LAN controller 212, and the LAN interface 217. Note that power does not have to be supplied to the entire RAM 206, and may be supplied only as necessary. While description has been made that only the power save key 214 of the operating unit 213 receives power supply here, power may be supplied to the operating unit 213 in accordance with transition conditions to another power supply state, such as a function of recognizing a user touch.

Next, transition conditions from the first power save mode to normal power mode will be described. In a case where the incoming detection unit 222 detects an incoming fax, the incoming detection unit 222 transmits a transition command to the power source control unit 203 via the FAX interface 208, thereby transitioning the power mode to the normal power mode. In a case where the LAN interface 217 receives a print job requiring transitioning to the normal control mode via the LAN controller 212, the LAN controller 212 transmits a transition command to the power source control unit 203, thereby transitioning the power mode to the normal power mode.

In a case where detection is made that the user has pressed the power save key 214, a transition command is transmitted to the power source control unit 203 via the operating unit interface 209 thereby transitioning the power mode to the normal power mode. While description has been made that only the power save key 214 of the operating unit 213 receives power supply here, a configuration may be made where a user touch is recognized, and an interruption is transmitted to the power source control unit 203. Description of detailed flows relating to the embodiments and transition to the second power save mode has been omitted in the transition conditions to the normal power mode described so far, but it is needless to say that if the power source control unit 203 receives a transition command partway through a flow, transition to the normal power mode is performed.

Figure 3C:
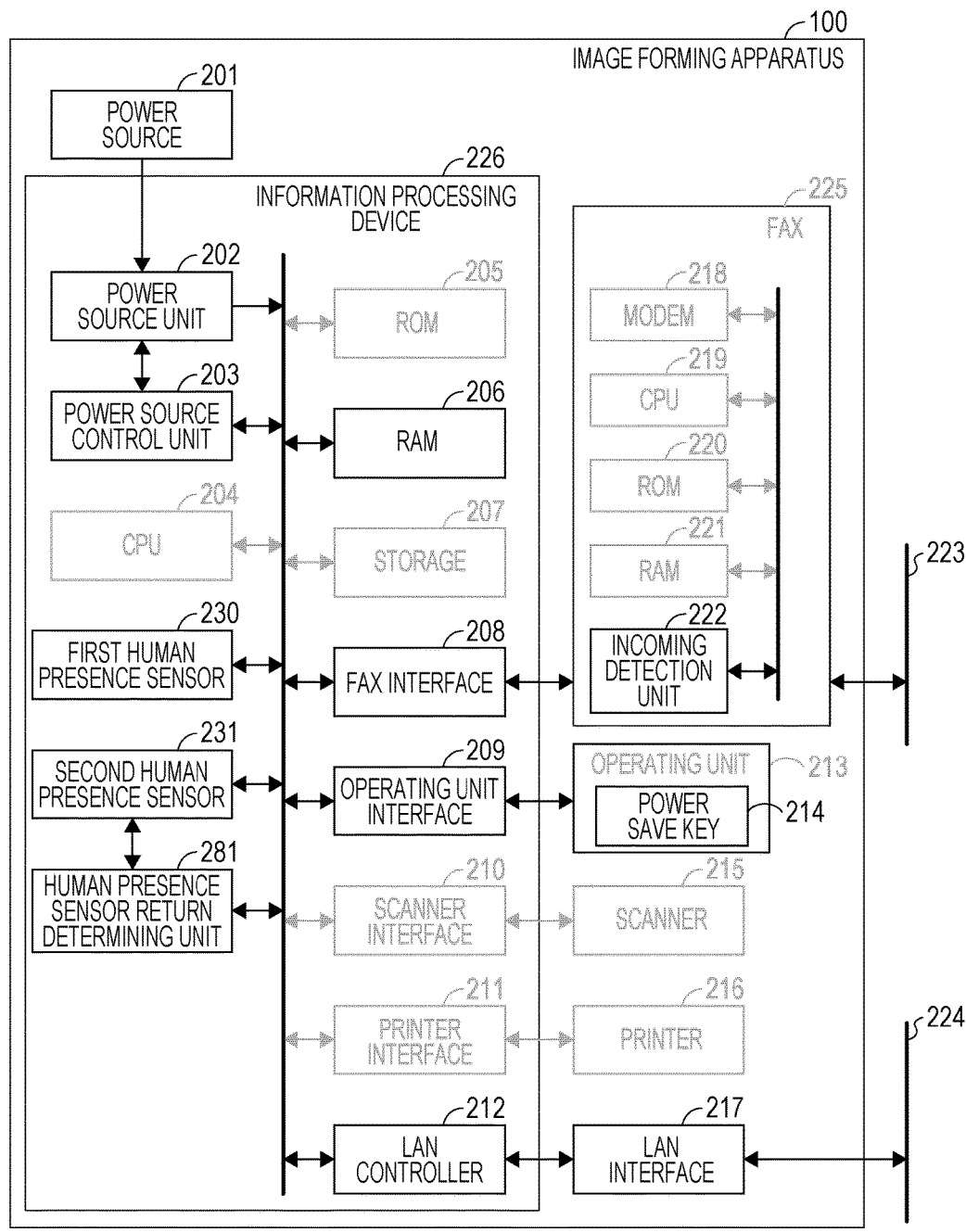

Next, transitioning conditions from the first power save mode to the second power save mode will be described. In a case where the first human presence sensor 230 detects a person approaching, the first human presence sensor 230 transmits a transition command to the power source control unit 203, to transition to the second power save mode, and the power source control unit 203 transitions to the second power save mode. In the second power save mode, power is supplied to a part of the blocks, as illustrated in FIG. 3C. The grayed out portions in FIG. 3C indicate that power is not being supplied thereto.

Next, the difference between the second power save mode and the first power save mode will be described. In the second power save mode, power is supplied to the second human presence sensor 231. The second power save mode is maintained as long as the first human presence sensor 230 is detecting a person. When the first human presence sensor 230 can no longer detect a person, the first human presence sensor 230 transmits a transition command to the power source control unit 203, to transition to the first power save mode, and the power source control unit 203 transitions to the first power save mode. In a case where the second human presence sensor 231 detects a person approaching, the second human presence sensor 231 transmits a transmission command to the power source control unit 203 via the human presence sensor return determining unit 281, to transition to the normal power mode, and the power source control unit 203 transitions to the normal power mode. The human presence sensor return determining unit 281 restricts signals from the second human presence sensor 231 to the power source control unit 203 (the aforementioned transition command to the normal power mode) under predetermined conditions, which will be described in detail later.

Figure 4:
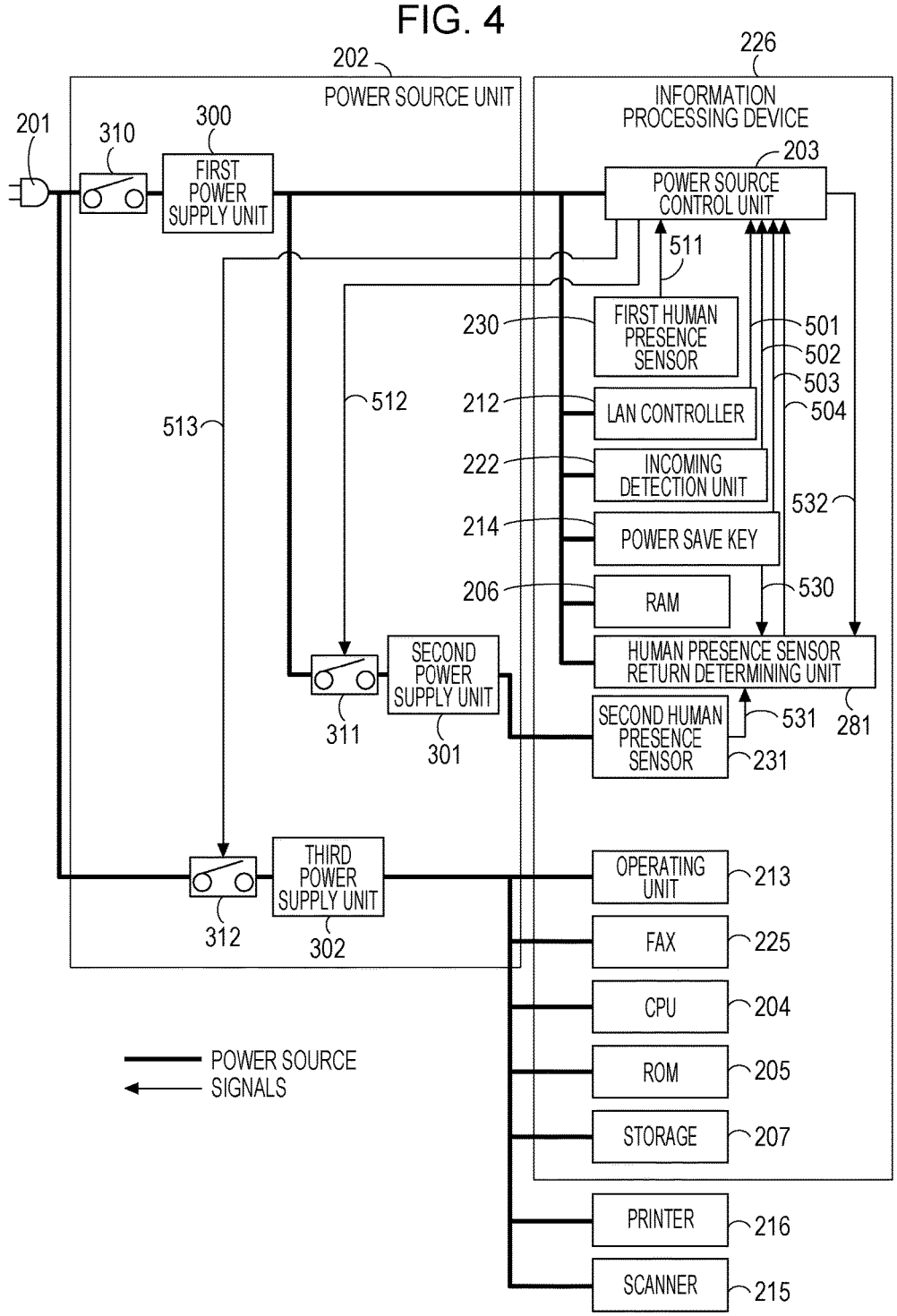
FIG. 4 is a diagram illustrating an example of a power supply arrangement of the image forming apparatus according to the first embodiment.

Next, power mode transition using human presence sensors will be described in detail with reference to FIG. 4. FIG. 4 is a diagram illustrating an example of a power supply form of the image forming apparatus 100 according to the first embodiment.

Power source power input from the power source 201 is input to a switch 310 and a switch 312. The switch 310 is configured as a seesaw switch, button switch, or the like, which the power source control unit 203 can turn on or the user can manually turn on. In a case where the switch 310 is turned on, the power source control unit 203 may automatically transmit a turn-on command 512 to a switch 311, and a turn-on command 513 to the switch 312, and transition to the normal power mode. A first power supply unit 300 receives supply of power by the switch 310 turning on, and supplies power to the blocks which operated under the first power save mode. While the FAX interface 208 and operating unit interface 209 are omitted from illustration in FIG. 4, it is to be understood that the first power supply unit 300 supplies power thereto as well.

In a case where the switch 311 is turned on, power is supplied to a second power supply unit 301 from the first power supply unit 300. The second power supply unit 301 supplies power to the blocks operating under the second power save mode. Conditions of transitioning from the first power save mode to the second power save mode are detection of a person by the first human presence sensor 230. The switch 311 and switch 312 can be realized by field effect transistors (FET), relay switches, or the like.

Upon detecting a person, the first human presence sensor 230 transmits a request signal 511 to the power source control unit 203, to turn on the switch 311. Upon receiving the request signal 511, the power source control unit 203 transmits a turn-on command 512 to the switch 311, and power is supplied to the second power supply unit 301.

Next, transitioning conditions to normal power mode will be described. In a case where the power source control unit 203 receives even one request signal necessitating transitioning to normal power mode, the power mode transitions to normal power mode. The following is description of each of request signals to transition to the normal power mode.

In a case of receiving a command necessitating transition to normal power mode, such as a print job or the like, the LAN controller 212 transmits a request command 501 to the power source control unit 203. Also, in a case of detecting an incoming fax, the incoming detection 222 unit transmits a request command 502 to the power source control unit 203. Note that in a case where the power save key 214 has been pressed by the user, the power save key 214 transmits a request command 503 to the power source control unit 203. Also, in a case where the power save key 214 has been pressed by the user, the power save key 214 outputs a signal 530 to the human presence sensor return determining unit 281 for invalid flag processing.

Upon having received any of the above transition request signals, the power source control unit 203 transmits a turn-on command 513 to the switch 312, and power is supplied to a third power supply unit 302. The third power supply unit 302 supplies power to the blocks used in the normal power mode. Though the scanner interface 210 and printer interface 211 are omitted from illustration in FIG. 4, power is supplied thereto from the third power supply unit 302 as well. The power supplied from the power source 201 is split and delivered to the three of first power supply unit 300, second power supply unit 301, and third power supply unit 302.

Next, description will be made regarding output of a transition request signal 504 based on the second human presence sensor 231. In a case of having detected a person, the second human presence sensor 231 transmits a detection signal 531 to the human presence sensor return determining unit 281. The human presence sensor return determining unit 281 determines whether the person which has instructed transitioning to the power save mode by operating the power save key 214 has left the image forming apparatus 100, and restricts returning from the power save mode based on the second human presence sensor 231.

In the present embodiment, in a case where a human presence sensor (the first human presence sensor 230, for example) continues to detect a person after transitioning to the power save mode has been instructed from the power save key 214, the human presence sensor return determining unit 281 restricts output of the transition request signal 504. In a case of transitioning to the power save mode due to other than the power save key 214, or in a case where a human presence sensor ceases to detect a person after transitioning to the power save mode has been instructed from the power save key 214, the human presence sensor return determining unit 281 cancels the output restriction on the transition request signal 504. Whether or not a human presence sensor is detecting a person has been described as being determined by transmission from the power source control unit 203, but an arrangement may be made where signals from the human presence sensor are transmitted to the human presence sensor return determining unit 281 for determination.

While the human presence sensor in the above description has been described as being the first human presence sensor 230, determination at the human presence sensor return determining unit 281 may be made any way as long as being able to determine that the person who instructed transitioning to the power save mode using the power save key 214, has left the vicinity of the image forming apparatus 100. Accordingly, the determination at the human presence sensor return determining unit 281 may be made with the detection state of either or both of the first human presence sensor 230 and second human presence sensor 231 as a reference. Hereinafter, description will be made assuming that as long as the first human presence sensor 230 continues detection, the human presence sensor return determining unit 281 restricts the transition request signal 504.

Figure 5:
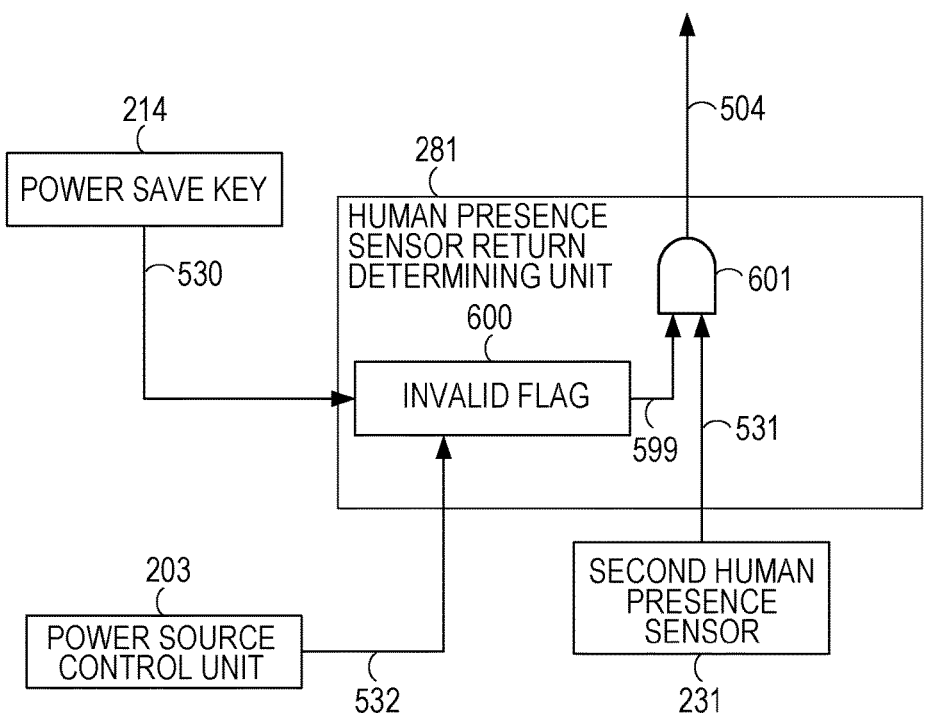
FIG. 5 is a diagram illustrating an example of the configuration of a human presence sensor return determination unit according to the first embodiment.

Output restriction of the transition request signal 504 by the human presence sensor return determining unit 281 will be described in detail now with reference to FIG. 5. FIG. 5 is a diagram illustrating an example of the configuration of the human presence sensor return determining unit 281 according to the first embodiment.

Upon the power save key 214 being pressed, a signal 530 is output from the power save key 214 to an invalid flag 600. The signal 530 is used to perform output restriction of the transition request signal 504 to transition to the normal power mode, based on the second human presence sensor 231. Also upon the power save key 214 being pressed, a power save mode transition instruction, omitted from illustration, is output from the power save key 214, and upon receiving this instruction the power source control unit 203 transitions to the power save mode.

In a case of having transitioned to the power save mode under the power save mode transition instruction from the power save key 214, the power source control unit 203 continues to output a signal 532 to the invalid flag 600 to restrict the transition request signal 504, as long as the first human presence sensor 230 is detecting a person. The signal 532 may be a detection signal of the first human presence sensor 230.

The invalid flag 600 sets a signal (hereinafter "human presence sensor invalid flag") 599 to "1" by default. Upon receiving the signal 530 from the power save key 214, the invalid flag 600 keeps the human presence sensor invalid flag 599 at "0" until reception of the signal 532 ceases. Further, upon reception of the signal 532 ceasing, the invalid flag 600 returns the human presence sensor invalid flag 599 to "1", and keeps the human presence sensor invalid flag 599 at "1" until the signal 530 is received again. In a case of receiving the signal 531 in a state where the human presence sensor invalid flag 599 is "1", a logic 601 outputs the transition request signal 504 to normal power mode based on the second human presence sensor 231 to the power source control unit 203.

Figure 6:
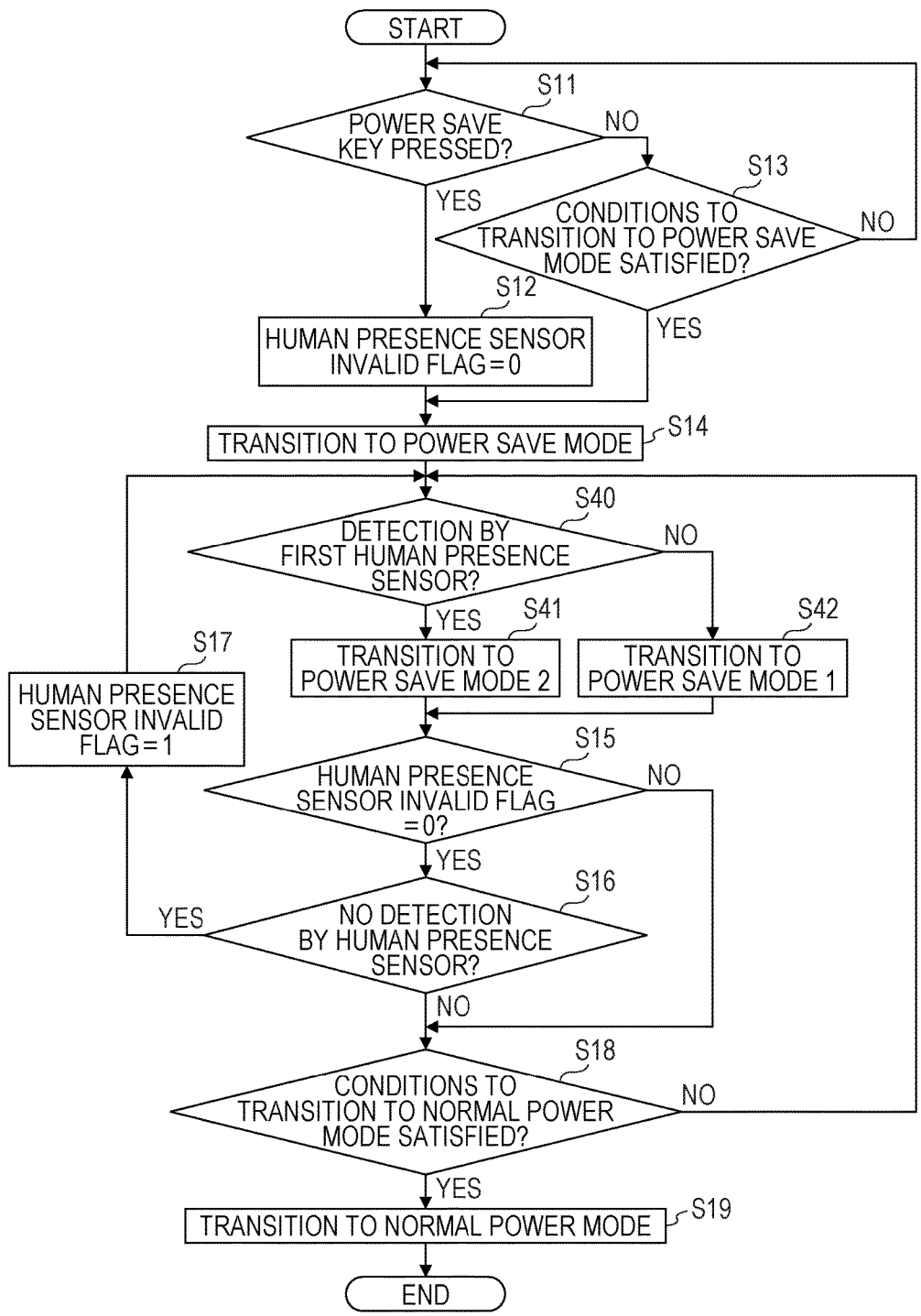
FIG. 6 is a flowchart illustrating an example of power mode transition operations according to the first embodiment.

FIG. 6 is a flowchart illustrating an example of a power mode transition operation in the image forming apparatus according to the first embodiment.

Upon the power save key 214 of the image forming apparatus 100 being pressed (Yes in S11), the signal 530 is output from the power save key 214 to the invalid flag 600, and the invalid flag 600 sets the human presence sensor invalid flag 599 to "0" (S12). In a case where the human presence sensor invalid flag 599 is "0", the transition request signal 504 to normal power mode from the human presence sensor return determining unit 281 is restricted. Also when the power save key 214 is pressed, the power source control unit 203 performs transition processing to the power save mode (S14). The power save mode to which transition is made here may be either the first power save mode or the second power save mode.

In a case where the power save key 214 has not been pressed (No in S11), but the power save mode transition conditions have been satisfied by other than pressing of the power save key 214 (Yes in S13), the power source control unit 203 performs transition processing to the power save mode (S14). In this case, the human presence sensor invalid flag 599 is set to "1". In a case where the human presence sensor invalid flag 599 is set to "1", the transition request signal 504 to the normal power mode from the human presence sensor return determining unit 281 is not restricted. Note that power save mode transition conditions other than the power save key 214 include, for example, the image forming apparatus 100 not being used for a predetermined amount of time.

After transitioning to the power save mode, the power source control unit 203 determines whether or not the first human presence sensor 230 is detecting (S40). In a case where determination is made that the first human presence sensor 230 is detecting (Yes in S40), the flow advances to S41; otherwise, the flow advances to S42.

In the event that the power mode at that time is the first power save mode, the power source control unit 203 transitions to the second power save mode and supplies power to the second human presence sensor 231. In the event that the power mode at that time is the second power save mode, the power source control unit 203 maintains the power state.

In S42, in the event that the power mode at that time is the second power save mode, the power source control unit 203 transitions to the first power save mode and stops supply of power to the second human presence sensor 231. In the event that the power mode at that time is the first power save mode, the power source control unit 203 maintains the power state.

In a case where the human presence sensor invalid flag 599 is "1" (No in S15), the human presence sensor return determining unit 281 can output the transition request signal 504 to the power source control unit 203 in accordance with the detection signal 531 from the second human presence sensor 231.

In a case where the human presence sensor invalid flag 599 is "0" (Yes in S15), the invalid flag 600 effects control to change the human presence sensor invalid flag 599 in accordance with the signal 532 from the power source control unit 203 based on the detection state of a human presence sensor. Note that the human presence sensors in S15 may be either the first human presence sensor 230 or the second human presence sensor 231, or both the first human presence sensor 230 and second human presence sensor 231 may be used for determination, since the purpose is to determine whether the user who has pressed the region power save key 214 has left the vicinity of the image forming apparatus 100.

In a case where a human presence sensor is in a detecting state (No in S16), output of the signal 532 from the power source control unit 203 is maintained, and accordingly the invalid flag 600 keeps the human presence sensor invalid flag 599 set to "0". In a case where the human presence sensor invalid flag 599 is "0", the human presence sensor return determining unit 281 does not transmit the transition request signal 504 to the power source control unit 203 even of the detection signal 531 is input from the second human presence sensor 231.

On the other hand, in a case where there is no detection by the human presence sensors (Yes in S16), output of the signal 532 from the power source control unit 203 is stopped, and accordingly the invalid flag 600 changes the human presence sensor invalid flag 599 to "1" (S17).

In a case where the human presence sensor invalid flag 599 is "1" (No in S15), the invalid flag 600 maintains the human presence sensor invalid flag 599 at "1" regardless of the signal 532 from the power source control unit 203 based on the detection state of the human presence sensor (the first human presence sensor 230 in this case). In a case where the human presence sensor invalid flag 599 is "1", and the detection signal 531 is input from the second human presence sensor 231, the human presence sensor return determining unit 281 transmits a transition request signal 504 to the power source control unit 203.

In a case of receiving none of the request signals 511, 501, 502, 503, and 504, the power source control unit 203 determines that the normal power mode transition conditions are not satisfied (No in S18), and the flow returns to S40 and determines whether or not the first human presence sensor 230 is detecting.

In a case of receiving any of the request signals 511, 501, 502, 503, and 504, the power source control unit 203 determines that the normal power mode transition conditions are satisfied (Yes in S18), and transitions to the normal power mode (S19).

Note that in a case where the human presence sensor invalid flag 599 is "0", the transition request signal 504 to the normal power mode is not output from the human presence sensor return determining unit 281, so even in a case where the second human presence sensor 231 senses a person, the normal power mode transition conditions are not satisfied. On the other hand, that in a case where the human presence sensor invalid flag 599 is "1", the transition request signal 504 to the normal power mode is not restricted, so in a case where the second human presence sensor 231 senses a person, the normal power mode transition conditions are satisfied.

Thus, in a case where the power save key 214 is pressed and transition to the power save mode is made, transition from the power save mode to the normal power mode due to the human presence sensors operating can be restricted until the user which has pressed the power save key 214 leaves the vicinity of the image forming apparatus 100. Accordingly, unnecessary return from the power save mode due to the human presence sensors detected after the power save key 214 is pressed can be prevented. As a result, reduction in unnecessary power consumption and extension of the life of parts of the apparatus can be realized while improving user usability.

Note that in the above description, a configuration has been illustrated where the human presence sensor return determining unit 281 restricts output of the transition request signal 504, so as to restrict return to the normal power mode due to detection by the second human presence sensor 231. However, a configuration may be made where no human presence sensor return determining unit 281 is provided, and the power source control unit 203 directly controls return to the normal power mode due to detection by the second human presence sensor 231. In this case, the detection signal 531 of the second human presence sensor 231 is directly input to the power source control unit 203. In a case where the power save key 214 is pressed and there also is detection by a human presence sensor (e.g., the first human presence sensor 230), the power source control unit 203 ignores the input of the detection signal 531. This will be described with reference to FIG. 6. In this case, the processes illustrated in FIG. 6 are realized by the power source control unit 203 reading out and executing programs stored in a storage device within the power source control unit 203.

In S11, the power source control unit 203 determines whether or not the power save key 214 has been pressed. In a case where determination is made that the power save key 214 has been pressed (Yes in S11), the power source control unit 203 transitions to S12. In S12, the power source control unit 203 sets the human presence sensor invalid flag 599 to "0" and transitions to S14. This flag is stored in an unshown storage unit within the power source control unit 203, and is set to "1" by default.

On the other hand, in a case where determination is made in S11 that the power save key 214 has not been pressed (NO in S11), the power source control unit 203 transitions to S13. In S13, the power source control unit 203 determines whether or not transition conditions to transition to the power save mode have been satisfied. Note that determination of transition conditions to the power save mode itself is performed by the CPU 204, and upon having received a transition instruction to the power save mode from the CPU 204, the power source control unit 203 judges that transition conditions to transition to the power save mode have been satisfied.

In S13, in a case of having determined that transition conditions to transition to the power save mode have not been satisfied (No in S13), the power source control unit 203 transitions to S11. On the other hand, in a case of having determined that transition conditions to transition to the power save mode have been satisfied (Yes in S13), the power source control unit 203 transitions to S14.

In S14, the power source control unit 203 performs processing to transition the power mode to the power save mode, and transitions to S40. This power save mode may be the first power save mode, or may be the second power save mode.

In S40, the power source control unit 203 determines whether or not the first human presence sensor 230 is detecting a person. In a case where the first human presence sensor 230 is detecting a person, the flow transitions to S41, and if not, transitions to S42.

In S41, in a case where the power mode at that time is the first power save mode, the power source control unit 203 transitions to the second power save mode and supplies power to the second human presence sensor 231. On the other hand, in a case where the power mode at that time is the second power save mode, the power source control unit 203 maintains the power state and transitions to S15.

In S42, in a case where the power mode at that time is the second power save mode, the power source control unit 203 transitions to the first power save mode and stops power supply to the second human presence sensor 231. On the other hand, in a case where the power mode at that time is the first power save mode, the power source control unit 203 maintains the power state and transitions to S15.

In S15, the power source control unit 203 determines whether or not the human presence sensor invalid flag 599 is "0". In a case where determination is made that the human presence sensor invalid flag 599 is "0" (Yes in S15), the flow transitions to S16, while in a case where determination is made that the human presence sensor invalid flag 599 is "1" (No in S15), the flow transitions to S18.

In S16, the power source control unit 203 determines whether or not a human presence sensor (e.g., the first human presence sensor 230) has entered a non-detecting state. In a case where determination is made that the human presence sensor is not detecting (Yes in S16), the power source control unit 203 determines that the user who pressed the power save key 214 has left the vicinity of the image forming apparatus 100, sets the human presence sensor invalid flag 599 to "1" (S17), and transitions to S40. On the other hand, In a case where determination is made that the human presence sensor is detecting a person (No in S16), the power source control unit 203 transitions to S18.

In S18, the power source control unit 203 determines whether or not the normal power mode transition conditions have been satisfied. In a case where the human presence sensor invalid flag 599 is "1" and having received any of the request signals 531, 511, 501, 502, and 503, the power source control unit 203 determines that the normal power mode transition conditions are satisfied. On the other hand, in a case where the human presence sensor invalid flag 599 is "0" and having received any of the request signals 511, 501, 502, and 503, the power source control unit 203 determines that the normal power mode transition conditions are satisfied, but if signal 531 is received, determines that the normal power mode transition conditions are not satisfied. That is to say, in a case where the human presence sensor invalid flag 599 is "0", transition to the normal power mode based on detection at the second human presence sensor 231 is restricted.

In a case where the power source control unit 203 determines that the normal power mode transition conditions are not satisfied (No in S18), the power source control unit 203 transitions to S40. On the other hand, in a case where determination is made that the normal power mode transition conditions are satisfied (Yes in S18), the power source control unit 203 transitions to the normal power mode (S19).

Also, an arrangement may be made such that, in a case where transition to the power save mode has been instructed by the power save key 214 and also the first human presence sensor 230 continues to detect the presence of a person, power supply to the second human presence sensor 231 is stopped, thereby restricting return to the normal power mode due to detection at the second human presence sensor 231.

Second Embodiment

An overview of difference as to the first embodiment will be described regarding the second embodiment. The first embodiment has been described as an arrangement where the image forming apparatus 100 detects that a user who pressed the power save key 214 has left the vicinity, and restricts unnecessary transition to the normal power mode. In the second embodiment, if there is no job after having transitions to the normal power mode, determination is made that the return to normal power mode is due to erroneous detection, and transition to normal power mode is restricted until the user who has pressed the power save key 214 leaves the vicinity of the image forming apparatus 100.

Figure 7:
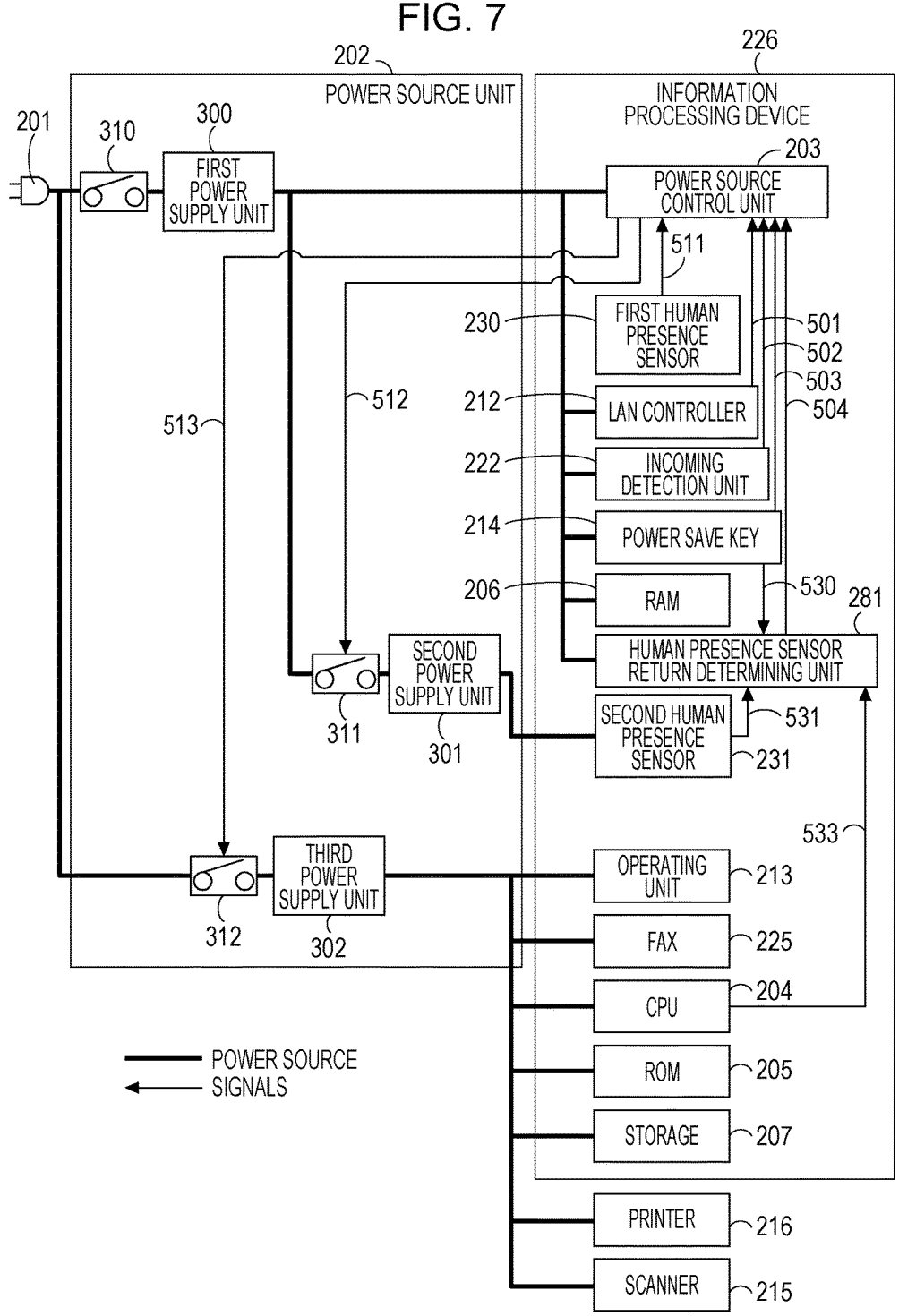
FIG. 7 is a diagram illustrating an example of a power supply arrangement of the image forming apparatus according to a second embodiment.

Hereinafter, difference as to the first embodiment will be described. Referencing FIG. 7 with regard to power mode transition using sensors, the difference as to FIG. 4 will be described. FIG. 7 is a diagram illustrating an example of a power supply form of the image forming apparatus 100 according to the second embodiment.

In the second embodiment, in a case of a job being performed after transitioning to the normal power mode, the CPU 204 transmits a signal 533 to the human presence sensor return determining unit 281. The signal 533 is used to enable output of the transition request signal 504, based on human presence detection by the second human presence sensor 231.

Figure 8:
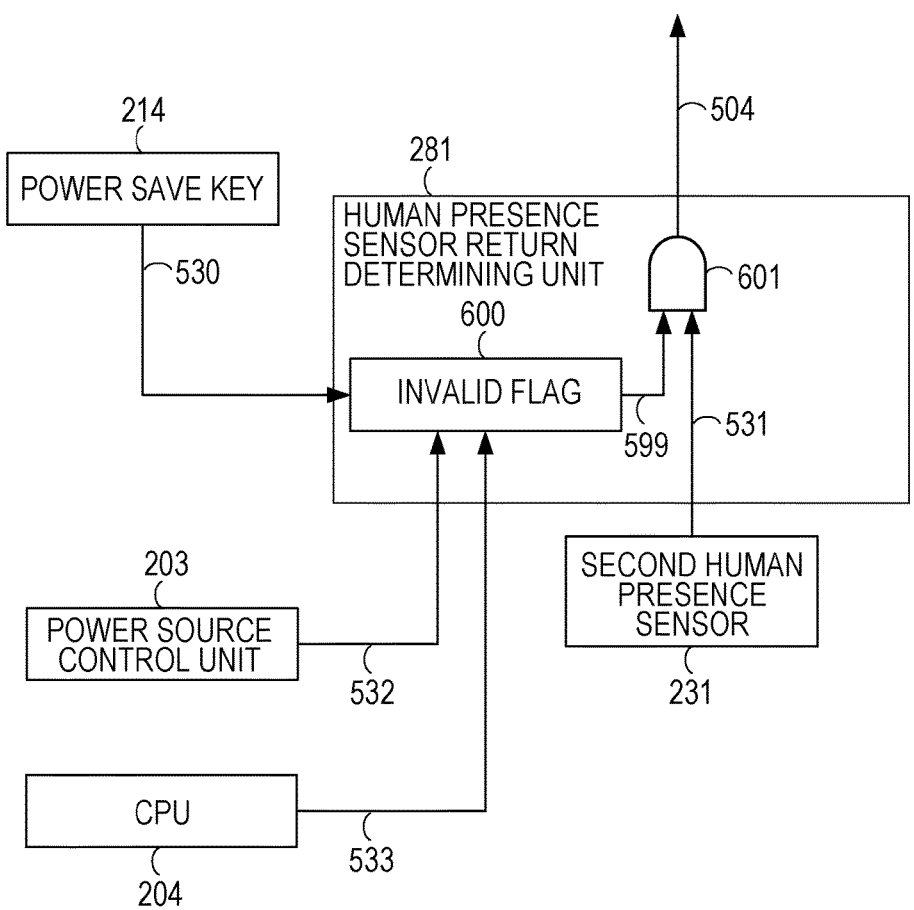
FIG. 8 is a diagram illustrating an example of the configuration of a human presence sensor return determination unit according to the second embodiment.

FIG. 8 is a diagram illustrating an example of the configuration of the human presence sensor return determining unit 281 according to the second embodiment. In a case where there is a job after having transitioned to the normal power mode, and the power save key 214 has been pressed, the signal 533 is output from the CPU 204 to the invalid flag 600. Upon receiving the signal 533, the invalid flag 600 sets a job flag stored in an unshown storage unit within the invalid flag 600 to "1". This job flag is "0" by default. Upon the job flag being "0" and the invalid flag 600 receiving a signal 530 from the power save key 214, the invalid flag 600 maintains the human presence sensor invalid flag 599 to "0" until reception of the signal 532 ceases. On the other hand, if the job flag is "1" and the invalid flag 600 receives the signal 530 from the power save key 214, the invalid flag 600 maintains the human presence sensor invalid flag 599 to "1". Other configurations are the same as those in FIG. 5, so description thereof will be omitted here.

FIG. 9 is a flowchart illustrating an example of power mode transition operations in the image forming apparatus according to the second embodiment. After having transitioned to the normal power mode (S20), if a job such as copying or scanning is performed (Yes in S21), the CPU 204 outputs a signal 533 to the invalid flag 600. Upon receiving the signal 533, the invalid flag 600 sets the job flag to "1". On the other hand, if no job such as copying or scanning is performed (No in S21) after having transitioned to the normal power mode (S20), the CPU 204 does not output the signal 533. Without reception of the signal 533, the invalid flag 600 keeps the job flag at "0".

In a case where the power save key 214 is pressed (Yes in S11), the power save key 214 outputs the signal 530 to the invalid flag 600. The invalid flag 600 receives the signal 530, and in a case of determining that the job flag is "0" (Yes in S24), the invalid flag 600 sets the human presence sensor invalid flag 599 to "0" (S12).

On the other hand, even if the signal 530 is received, if determining that the job flag is "1" (No in S24), the invalid flag 600 keeps the human presence sensor invalid flag 599 at "1". The subsequent operations are the same as with the case in FIG. 6, so description thereof will be omitted here.

As described above, including whether or not there has been a job after having transitioned to the normal power mode in the determination criterion enables power mode transition to be controlled while determining whether or not there has been a transition to the normal power mode due to an erroneous detection. Thus unnecessary transition to the normal power mode can be restricted. Accordingly, unnecessary return from the power save mode due to detection by a human presence sensor after the power save key 214 has been pressed, can be prevented, and as a result, reduction in unnecessary power consumption and extension of the life of parts of the apparatus can be realized.

A description has been made here where the human presence sensor return determining unit 281 restricts the output of the transition request signal 504 and thus restricts return to the normal power mode due to detection by the second human presence sensor 231. However, an arrangement may be made where the human presence sensor return determining unit 281 is not provided, and the power source control unit 203 directly controls return to the normal power mode due to detection by the second human presence sensor 231. Only the differences as to the first embodiment will be described here as well. In this case, the signal 533 from the CPU 204 is directly input to the power source control unit 203, and the job flag is stored in the power source control unit 203. In a case where the power save key 214 is pressed and determination is made that the job flag is "0", input of the detection signal 531 to the power source control unit 203 is ignored. This will be described below with reference to the flowchart in FIG. 9. In this case, the processes illustrated in FIG. 9 are realized by the power source control unit 203 reading out and executing programs stored in an unshown storage device within the power source control unit 203.

In a case of having received the signal 533 from the CPU 204, the power source control unit 203 determines that a job such as copying or scanning has been performed (Yes in S21) after having transitioned to the normal power mode (S20), sets the job flag to "1" (S22), and transitions to S11. On the other hand, in a case of having received no signal 533 from the CPU 204, the power source control unit 203 determines that no job such as copying or scanning has been performed (No in S21) after having transitioned to the normal power mode (S20). In this case, the power source control unit 203 keeps the job flag at "0" (S23), and transitions to S11.

In a case of determining that the power save key 214 has been pressed (Yes in S11), the power source control unit 203 transitions to S24. In S24, the power source control unit 203 determines whether or not the job flag is "0". In a case of determining that the job flag is "0" (Yes in S24), the power source control unit 203 sets the human presence sensor invalid flag 599 to "0", and transitions to S14. On the other hand, in a case of determining that the job flag is not "0" (No in S24), the power source control unit 203 keeps the human presence sensor invalid flag 599 at "1", and transitions to S14. The subsequent operations are the same as with the first embodiment, so description thereof will be omitted here.

Third Embodiment

An overview of difference as to the first embodiment will be described regarding the third embodiment. The first embodiment has been described as an arrangement where two human presence sensors are used to restrict unnecessary transition to the normal power mode in power mode transition. In the third embodiment, a human presence sensor array where infrared sensors are arrayed in a matrix form is used as the human presence sensor, thereby restricting unnecessary transition to the normal power mode using a single human presence sensor.

Figure 10A:
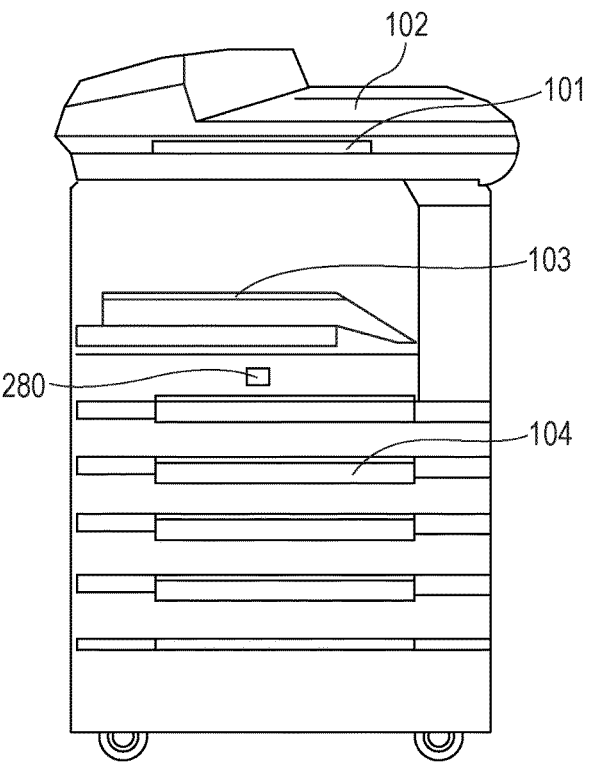
FIGS. 10A and 10B are diagrams illustrating examples of the configuration of an image forming apparatus according to a third embodiment.
Figure 10B:
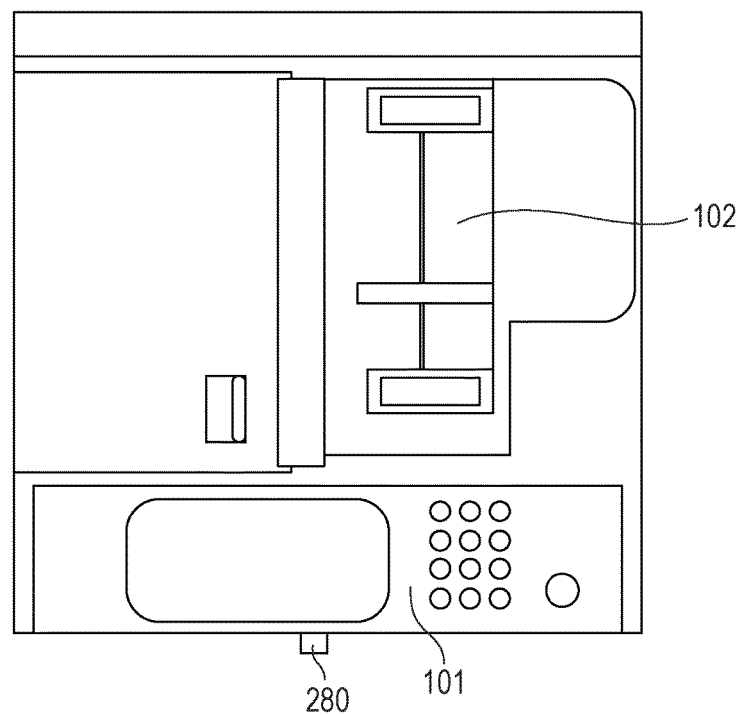

FIGS. 10A and 10B are diagrams illustrating an example of the configuration of an image forming apparatus according to the third embodiment. FIG. 10A corresponds to a frontal view of the image forming apparatus, and FIG. 10B corresponds to a top view of the image forming apparatus. As illustrated in FIGS. 10A and 10B, the image forming apparatus 100 according to the third embodiment includes a human presence sensor array 280.

Figure 11:
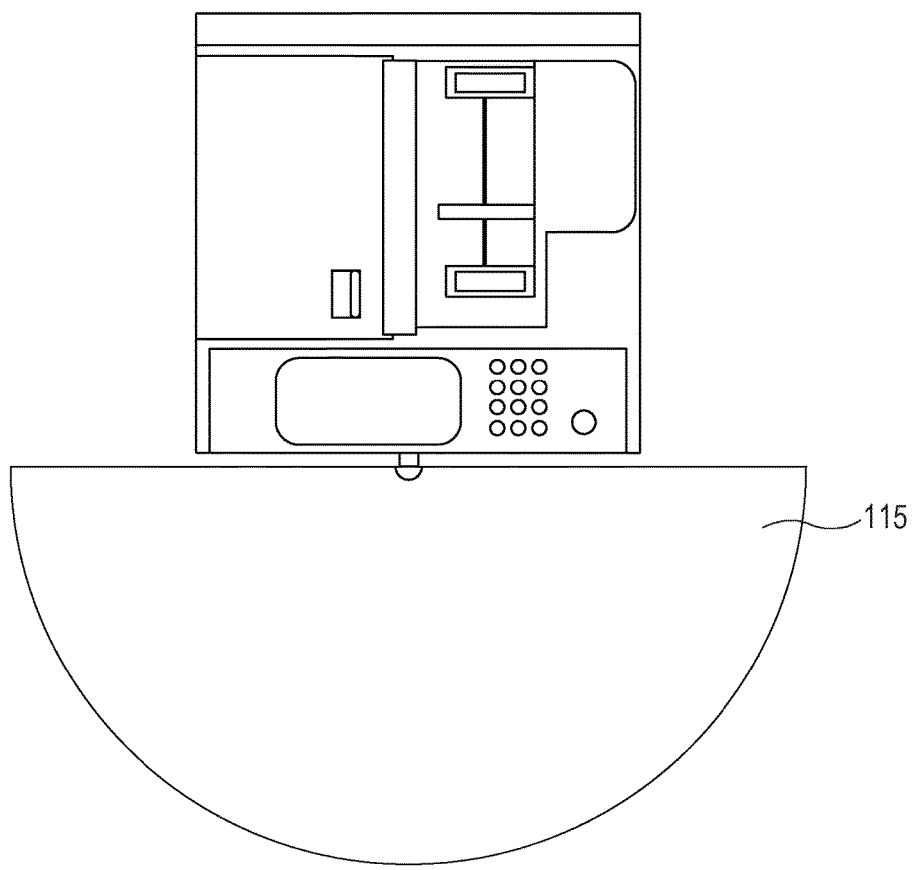
FIG. 11 is a diagram illustrating an example of the detection range of a human presence sensor array.

FIG. 11 is a diagram illustrating an example of a detection range 115 of the human presence sensor array 280. The human presence sensor array 280 is used as a trigger to transition from the power save mode to the normal power mode. The human presence sensor array 280 is formed of infrared sensors arrayed in matrix form, and can detect objects such as humans and the like in each of multiple regions into which the sensor detection range is divided. The human presence sensor array 280 can not only detect that a person has approached and is within the area, but also can detect that person's movements in detail.

A human presence sensor array determining unit 282 can obtain, from the human presence sensor array 280, the position of the region where the human presence sensor array 280 has detected a person, as region position information. The human presence sensor array 280 is an N×M array of infrared sensors such as pyroelectric sensors or reflection sensors (while the present embodiment will be described regarding an example where an 8×8 array of pyroelectric sensors is formed, the disclosure is not restricted to this arrangement). The pyroelectric sensors are passive human presence sensors which detect human bodies by detecting temperature change from infrared rays naturally emitted from human bodies and the like which have heat (heat source). The sensor array making up the human presence sensor array 280 is not restricted to a pyroelectric sensor array, and may be another type of human presence sensor array. The human presence sensor array 280 may be formed of any sort of sensor array, as long as multiple pyroelectric sensors or reflection sensor or the like are arrayed and human presence can be comprehended in detail. An example where a pyroelectric sensor array is used as the human presence sensor array 280 to detect human motion based on heat sources will be described.

Figure 12A:
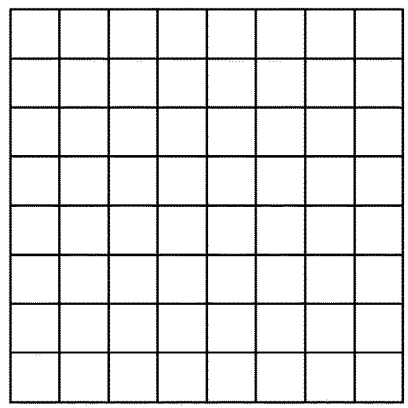
FIGS. 12A through 12D are diagrams illustrating examples of response of a human presence sensor array.

FIGS. 12A through 12D are diagrams illustrating examples of response of a human presence sensor array 280. FIG. 12A illustrates the response of the human presence sensor array 280 when there are no people nearby. The human presence sensor array 280 has detected no human heat sources, so none of the sensors are reacting.

Figure 12B:
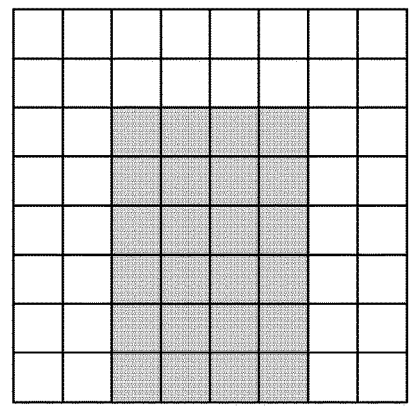
Figure 12C:
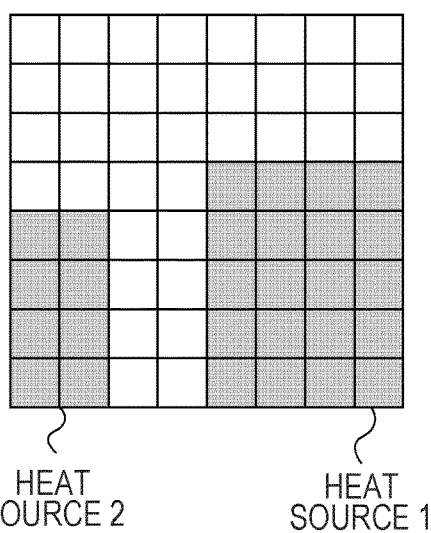
Figure 12D:
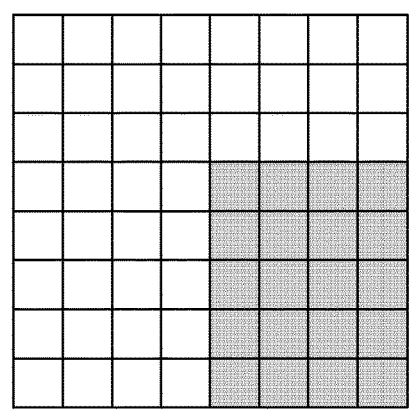

FIG. 12B illustrates an example of conditions for a trigger to transition to the normal power mode. In a case where the human presence sensor array 280 has detected that a heat source has occurred in the middle of the detection area of the human presence sensor array 280, determination is made that a person has approached to use the image forming apparatus 100, and transition is made to the normal power mode. An arrangement may be made where transition is made to the normal power mode in a case of this response in this area continuing for a predetermined amount of time, to prevent erroneous operation. Also, an arrangement may be made where the sensor information of the human presence sensor array 280 is extracted a certain intervals, and transition is made to the normal power mode in a case where the reaction continues a predetermined number of times (twice or more). Here, description will be made regarding transitioning to the normal power mode in a case where there has been the reaction in the range illustrated in FIG. 12B. FIGS. 12C and 12D will be described later.

Figure 13A:
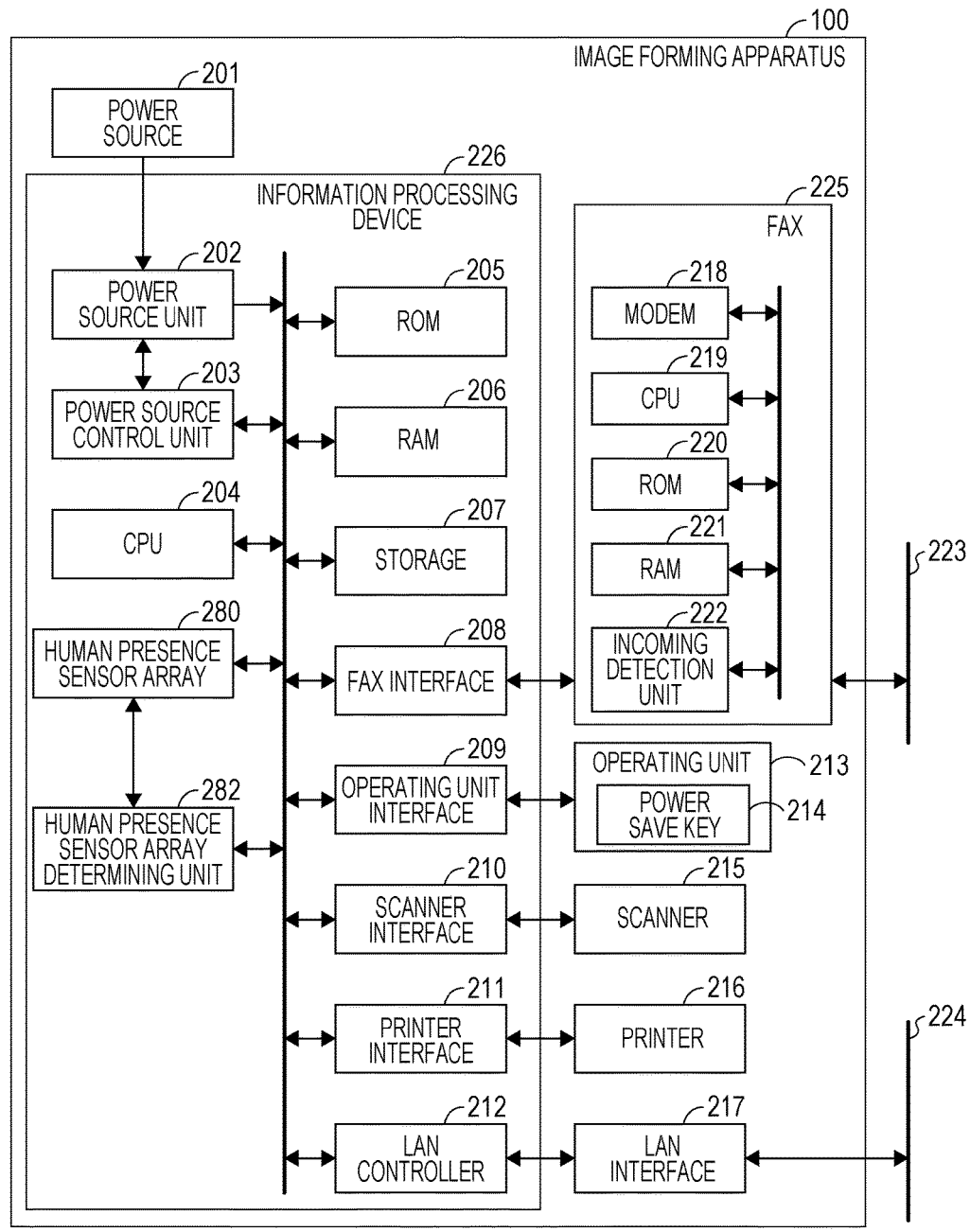
FIGS. 13A and 13B are diagrams illustrating examples of the hardware configuration of the image forming apparatus according to the third embodiment.
Figure 13B:
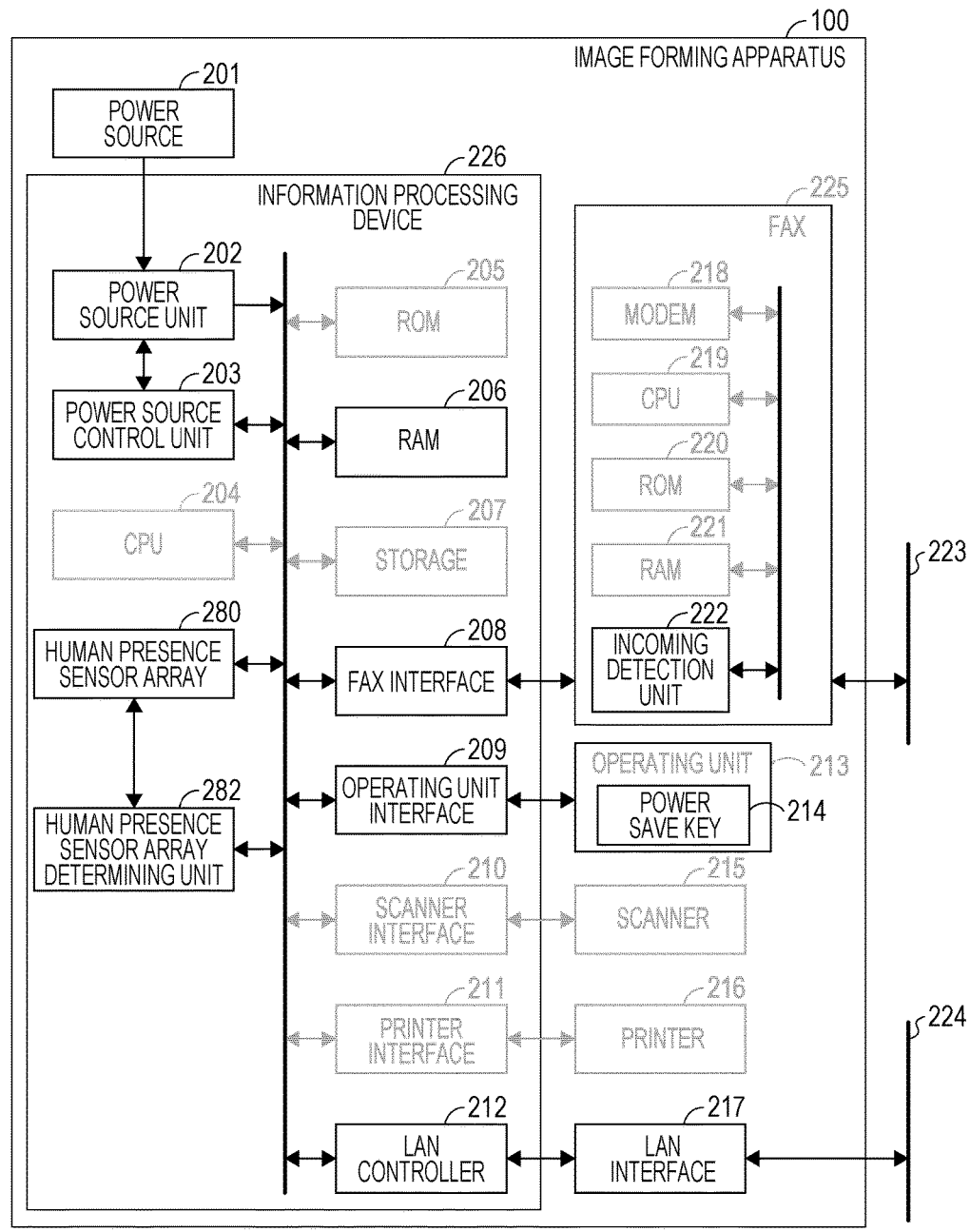

FIGS. 13A and 13B are block diagrams illustrating an example of the hardware configuration of the image forming apparatus 100 according to the third embodiment. Hereinafter, differences as to the first embodiment illustrated in FIGS. 3A through 3C will be described.

The first embodiment illustrated in FIG. 3 has two human presence sensors, the first human presence sensor 230 and the second human presence sensor 231. Power modes supplying power to the human presence sensors are switched as the first power save mode and the second power save mode, to avoid unnecessary power usage. On the other hand, the third embodiment uses the human presence sensor array 280, so there is only one power save mode. A case where transition is made from the power save mode to the normal power mode using the human presence sensor array 280 is a case where a predetermined condition (FIG. 12B) is satisfied at the human presence sensor array determining unit 282.

FIG. 13A illustrates blocks to which power is supplied in the normal power mode, and FIG. 13B illustrates blocks to which power is supplied in the power save mode. The grayed out portions in FIG. 13B are not supplied with power in the power save mode.

Figure 14:
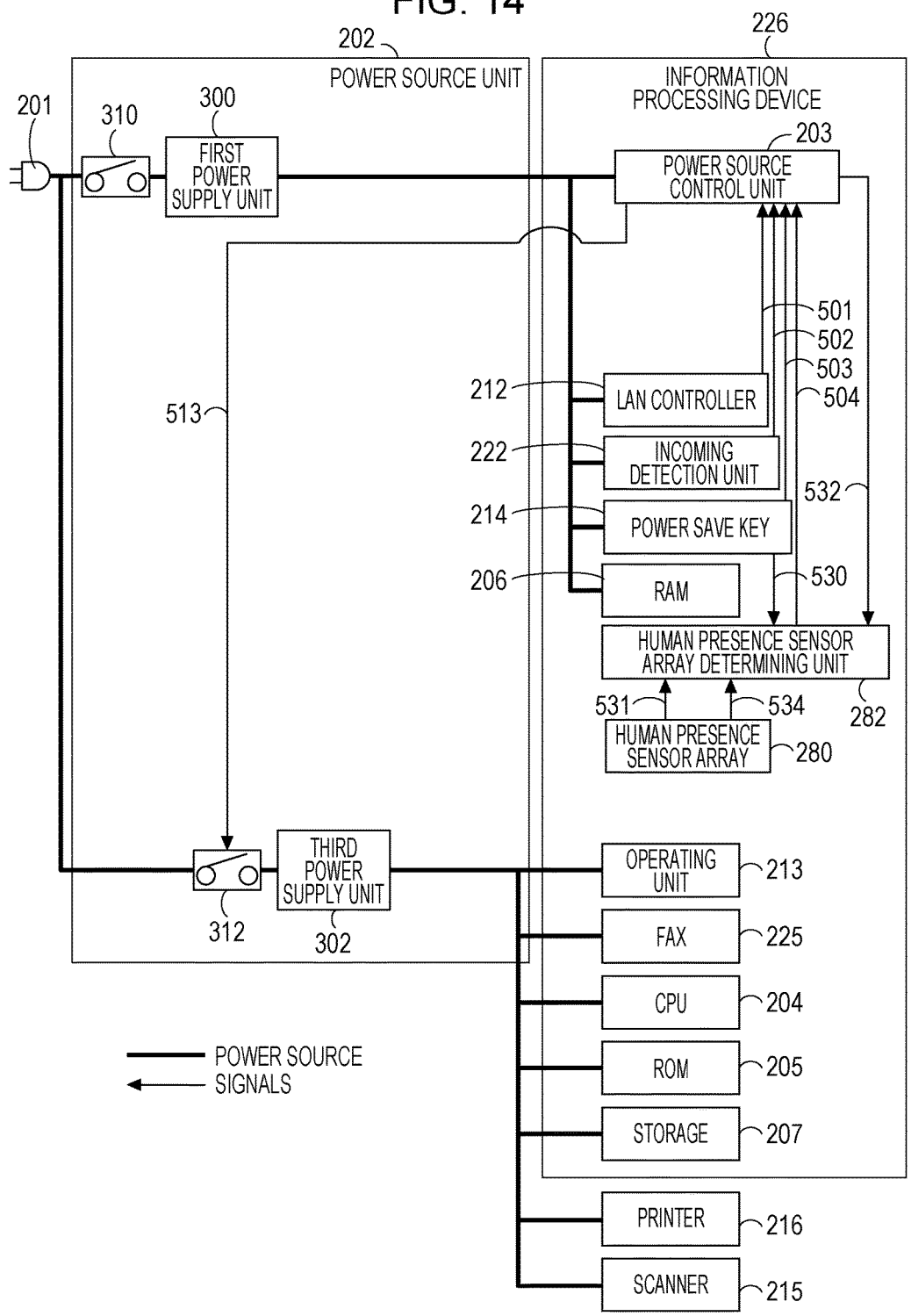
FIG. 14 is a diagram illustrating an example of a power supply arrangement of the image forming apparatus according to the third embodiment.

Hereinafter, differences regarding power mode transition using sensors as to the first embodiment illustrated in FIG. 4 will be described with reference to FIG. 14. FIG. 14 is a diagram illustrating an example of a power supply form to the image forming apparatus according to the third embodiment.

In the third embodiment, the human presence sensor array determining unit 282 determines whether or not to output a transition request signal to the normal power mode. The human presence sensor array determining unit 282 determines whether or not conditions such as illustrated in FIG. 12B are satisfied. The human presence sensor array 280 outputs the signal 531 and signal 534 to the human presence sensor array determining unit 282. The signal 531 and signal 534 are signals whereby the position of the region where the human presence sensor array 280 has detected the heat source can be identified, and are used to determine output of the transition request signal at the human presence sensor array determining unit 282.

In the example illustrated in FIG. 15, the human presence sensor array 280 outputs the signal 531 in a case where a first heat source has been detected, and outputs the signal 534 in a case where a second heat source has been detected. However, an arrangement may be made where the human presence sensor array 280 outputs only the signal 531 to the human presence sensor array determining unit 282 when a heat source is detected, and the human presence sensor array determining unit 282 determines detection of the second heat source from the position of detection of the heat source which the signal 531 indicates.

Detailed output restriction of the transition request signal 504 by the human presence sensor array determining unit 282 will be described with reference to FIG. 15. FIG. 15 is a diagram illustrating an example of the configuration of the human presence sensor array determining unit 282 according to the third embodiment.

An arrangement can be made to detect motions of users in detail by using the human presence sensor array 280. A case where there are multiple heat source, as in the case in FIG. 12C, can also be determined.

In a case where the human presence sensor array 280 has detected a heat source 1 which is a first heat source, the human presence sensor array 280 outputs the signal 531 to a condition determining circuit 603, and in a case of detecting a heat source 2 which is a second heat source, outputs the signal 534 to the condition determining circuit 603.

The condition determining circuit 603 determines whether or not to output the transition request signal based on conditions such as illustrated in FIG. 12B, from the state of the signal 531, and outputs a signal 536 to a logic 601. The condition determining circuit 603 also determines whether or not to output the transition request signal based on conditions such as illustrated in FIG. 12B, from the state of the signal 534, and outputs a signal 537 to a logic 602.

While the human presence sensor array 280 is detecting the user which has pressed the power save key 214 as illustrated in FIG. 12D, the human presence sensor invalid flag 599 is set to "0" by the invalid flag 600, output restriction of the signal 536 is performed, and transition to the normal power mode is restricted. This enables an operations where transition to the normal power mode is restricted regarding the heat source 1 which is the user who has pressed the power save key 214, while enabling transition to the normal power mode regarding the heat source 2 who is a different user, such as illustrated in FIG. 12C.

In a case where the power save key 214 has been pressed, the signal 530 is transmitted from the power save key 214 to the invalid flag 600, and the transition request signal 536 from the human presence sensor array 280 is disabled. In a case where the human presence sensor array 280 stops detecting, the human presence sensor array 280 outputs a signal 535 to the invalid flag 600, and enables the request signal 536 from the human presence sensor array 280. Also, in a case where the heat source which is the user who has pressed the power save key 214 as being detected, and a separate heat source from this heat source is detected at that time, the signal 534 is output from the human presence sensor array 280 to the condition determining circuit 603. In a case where the detection state according to the signal 534 satisfies transition conditions, the condition determining circuit 603 outputs a request signal 537 to the logic 602, and outputs the transition request signal 504, for transition to the normal power mode.

FIG. 16 is a flowchart illustrating an example of power mode transition operations in the image forming apparatus according to the third embodiment. The processing in S11 through S14 is the same as in FIG. 6, so description thereof will be omitted here.

In a case where the human presence sensor invalid flag 599 is "0" (Yes in S15), the invalid flag 600 controls the human presence sensor invalid flag 599 so as to be changed in accordance with the detection signal 535 from the human presence sensor array 280.

In a case where the human presence sensor array 280 is in a detecting state (No in S16), the output of the signal 535 from the human presence sensor array 280 is maintained, and accordingly the invalid flag 600 maintains the human presence sensor invalid flag 599 at "0". In a case where the human presence sensor invalid flag 599 is "0", the human presence sensor array determining unit 282 does not transmit the transition request signal 504 to the power source control unit 203 even if the detection signal 531 is input from the human presence sensor array 280 and the predetermined condition (FIG. 12B for example) are satisfied. Note that determination of conditions such as in FIG. 12B is performed by the condition determining circuit 603.

Note however, even in a case where the human presence sensor invalid flag 599 is "0", if the human presence sensor array 280 detects a separate person (Yes in S30), the human presence sensor array determining unit 282 transmits the transition request signal 504. A case of detecting another person in S30 is a case where another heat source 2 (new object) different from the heat source 1 is detected by the human presence sensor array 280 as illustrated in FIG. 12C, thereby satisfying the conditions such as in FIG. 12B.

Also, in a case where the human presence sensor array 280 ceases detecting (Yes in S16), the output of the signal 535 from the human presence sensor array 280 is stopped, and accordingly the invalid flag 600 changes the human presence sensor invalid flag 599 to "1" (S17).

In a case where the human presence sensor invalid flag 599 is "1" (No in S15), the invalid flag 600 maintains the human presence sensor invalid flag 599 at "1" regardless of the detection signal 535 from the human presence sensor array 280. In a case where the human presence sensor invalid flag 599 is "1", the human presence sensor return determining unit 281 transmits the transition request signal 504 to the power source control unit 203 when the detection signal 531 is input from the human presence sensor array 280 and predetermined conditions (FIG. 12B for example) are satisfied. Determination of conditions such as in FIG. 12B is performed by the condition determining circuit 603.

In the third embodiment, in a case where the human presence sensor invalid flag 599 is "0", the human presence sensor array determining unit 282 does not output the transition request signal 504 when only one heat source is detected by the human presence sensor array 280. Accordingly, the normal power mode transition conditions are not satisfied in a case where the human presence sensor array 280 has detected the person who has pressed the power save key 214. However, even if the human presence sensor invalid flag 599 is "0", the human presence sensor array determining unit 282 outputs the transition request signal 504 if two or more heat sources are detected by the human presence sensor array 280. Accordingly, in a case where the human presence sensor array 280 has detected a separate person from the person who pressed the power save key 214 under conditions such as in FIG. 12B, the normal power mode transition conditions are satisfied. Of course, output of the transition request signal 504, is not restricted when the human presence sensor invalid flag 599 is "1", is in a case where the human presence sensor array 280 detects a person under conditions as in FIG. 12B, normal power mode transition conditions are satisfied.

Using the human presence sensor array 280 as described above enables transitioning to the normal power mode to be restricted regarding the user who has pressed the power save key 214, while enabling transitioning to the normal power mode for other users. Accordingly, unnecessary recovery from the power save mode due to detection of human presence sensors after the power save key 214 has been pressed can be prevented, thereby improving user usability. Thus, the same advantage as using two human presence sensors can be obtained by using the human presence sensor array 280. The third embodiment does away with the need to switch between the first power save mode and the second power save mode.

Description has been made above regarding an arrangement where the human presence sensor array determining unit 282 restricts the output of the transition request signal 504, and restricts return to the normal power mode due to detection by the human presence sensor array 280. However, an arrangement may be made where no human presence sensor array determining unit 282 is provided, and the power source control unit 203 directly restricts return to the normal power mode by detection of the human presence sensor array 280. In this case as well, only the differences as to the first embodiment will be described. In this case, the signals 531 and 534 from the human presence sensor array 280 are directly input to the power source control unit 203, and the human presence sensor invalid flag 599 is stored within the power source control unit 203. In a case where the power save key 214 is pressed and the human presence sensor invalid flag 599 is determined to be "0", the power source control unit 203 ignores input of the detection signal 531 thereto. On the other hand, if the detection signal 534 is input to the power source control unit 203, the power source control unit 203 does not ignore even if the human presence sensor invalid flag 599 is "0", and returns to the normal power mode in a case where conditions such as in FIG. 12B are satisfied.

Description will be made below with reference to the flowchart in FIG. 16. In this case, the processes illustrated in FIG. 16 are realized by the power source control unit 203 reading out and executing programs stored in an unshown storage device within the power source control unit 203.

In S15, the power source control unit 203 determines whether or not the human presence sensor invalid flag 599 is "0". In a case of determining that the human presence sensor invalid flag 599 is "0" (Yes in S15), the flow transitions to S16, while in a case of determining that the human presence sensor invalid flag 599 is "1" (No in S15), the flow transitions to S18.

In S16, the power source control unit 203 determines whether or not the human presence sensor array 280 has ceased detecting. In a case where determination is made that the human presence sensor array 280 has ceased detecting (Yes in S16), the power source control unit 203 determines that the user who pressed the power save key 214 has left the vicinity of the image forming apparatus 100 sets the human presence sensor invalid flag 599 to "1" (S17), and transitions to S15. In a case of determining in S16 that the human presence sensor array is detecting a person (No in S16), the power source control unit 203 transitions to S30.

In S30, the power source control unit 203 determines whether or not the human presence sensor array 280 has detected another person (new object). A case where a different person has been detected in S30 corresponds to a case where the human presence sensor array 280 has detected a heat source 2 which is different from the heat source 1 as illustrated in FIG. 12C, so that conditions such as in FIG. 12B are satisfied.

In a case where determination is made in S30 that the human presence sensor array 280 has not detected another person (new object) (No in S16), the power source control unit 203 transitions to S15. On the other hand, in a case where determination is made in S30 that the human presence sensor array 280 has detected another person (new object) (Yes in S30), the power source control unit 203 transitions to S18.

In S18, the power source control unit 203 determines whether or not normal power mode transition conditions have been satisfied. In a case where the human presence sensor invalid flag 599 is "1" and having received any of the request signals 531, 511, 501, 502, and 503, the power source control unit 203 determines that the normal power mode transition conditions are satisfied. On the other hand, in a case where the human presence sensor invalid flag 599 is "0" and having received any of the request signals 511, 501, 502, and 503, the power source control unit 203 determines that the normal power mode transition conditions are satisfied, but if signal 531 is received, determines that the normal power mode transition conditions are not satisfied. Further in this case, upon having received the signal 534, the power source control unit 203 determines that normal power mode transition conditions have been satisfied. That is to say, in a case where the human presence sensor invalid flag 599 is "1", detection by the human presence sensor array 280 of the user which has pressed by power save key 214 is ignored, but detection of another use is enabled, and control is effected so as to transition to the normal power mode.

Note that while a human presence sensor array is used in the present embodiment, any sort of human presence sensor may be used as long as it is a human presence sensor which can recognize the number of objects being detected. That is to say, a human presence sensor which can recognized a user separate to the user which has pressed the power save key 214 is sufficient.

Also, a configuration where the second embodiment and the third embodiment are combined may be made. That is to say, in a case where there is no job after transitioning to the normal power mode, the job flag is set to "0", and if there is a job, the job flag is set to "1". A configuration which sets the human presence sensor invalid flag 599 to "0" of the job flag is "0" in a case where the power save key 214 is pressed, is added to the third embodiment. Accordingly, in addition to the configuration of the third embodiment, a configuration can be added which restricts transition to the normal power mode in a case where instruction to the power save mode has been given by the power save key 214 without a job being input after transitioning to the normal power mode.

Also, the configurations and contents of various data described above are not restricted thusly, and it is needless to say that various configurations and contents thereof may be made according to usage and purpose.

Also, while embodiments of the disclosure have been illustrated, the disclosed embodiments may assume various modes as a system, apparatus, method, program, storage medium, or the like, for example. Specifically, the disclosed embodiments may be applied to a system configured including multiple devices, or may be applied to an apparatus including a single device. All combinations of the above-described embodiments are also encompassed by the disclosure.

Other Embodiments

The disclosure can also be carried out by software (programs) realizing the functions of the above-described embodiments being supplied to a system or apparatus via network or any of various types of storage media, and a computer (or CPU or MPU or the like) of the system or apparatus reading out and executing the program. The disclosure may be applied to a system configured including multiple devices, or may be applied to an apparatus including a single device.

The disclosure is not restricted to the above-described embodiments; rather, various modifications (including organic combinations of the embodiments) may be made based on the essence of the disclosure, without departing from the scope of the disclosure. Further, all combinations of the embodiments described above and modifications thereof are encompassed by the disclosure.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus, having a power state including at least a first power state and a second power state in which less power is consumed than the first power state, the image forming apparatus comprising:
   a user interface which receives a user operation to shift the power state from the first power state to the second power state;
   a human sensor which detects a human around the image forming apparatus;
   a power controller which shifts the power state from the second power state to the first power state based on one or more signals output from the human sensor; and
   a prohibit unit which prohibits a shift of the power state from the second power state to the first power state based on the human sensor during a predetermined period after the user interface receives the user operation.

2. The image forming apparatus according to claim 1, wherein the prohibit unit stops prohibiting the shift of the power, based on one or more signals output from the human sensor.

3. The image forming apparatus according to claim 2, wherein the prohibit unit stops prohibiting the shift of the power state, in a case where the one or more signals output from the human sensor indicates a non-detection.

4. The image forming apparatus according to claim 1, further comprising:
   another human sensor which has a wider detecting range than a detecting range of the human sensor,
   wherein the human sensor is enabled to detect a human based on detection of a human by the another human sensor.

5. The image forming apparatus according to claim 1, wherein the human sensor is a pyroelectric sensor.

6. The image forming apparatus according to claim 1, wherein the human sensor is an array sensor in which sensor elements configured to receive infrared light are arranged in a matrix.

7. The image forming apparatus according to claim 1,
wherein the prohibit unit stops the one or more signals output from the human sensor during the predetermined period.

8. The image forming apparatus according to claim 7,
wherein the prohibit unit includes a gate logic element which inputs the one or more signals output from the human sensor, and the gate logic element stops the one or more signals output from the human sensor during the predetermined period.

9. The image forming apparatus according to claim 1, further comprising:
a printer which prints an image on a sheet.

10. The image forming apparatus according to claim 1,
wherein the prohibit unit prohibits the shift of the power state during the predetermined period in a period after the user interface receives the user operation before the detection result of the human sensor indicates a non-detection.

11. The image forming apparatus according to claim 1,
wherein the prohibit unit prohibits the shift of the power state based on one or more signals output from the human sensor during the predetermined period.

12. The image forming apparatus according to claim 1,
wherein the prohibit unit prohibits the shift of the power state based on the human sensor, and then the power controller shifts the power state from the first power state to the second power state based the user operation received by the user interface.

13. The image forming apparatus according to claim 1, further comprising:
a display unit;
wherein the display unit is turned off in the second power state and the display unit is turned on in the first power state.

14. A control method of an image forming apparatus, having a power state including at least a first power state and a second power state in which less power is consumed than the first power state, the control method comprising:
receiving, by a user interface, a user operation to shift the power state from the first power state to the second power state;
shifting the power state from the second power state to the first power state based on one or more signals output from a human sensor for detecting a human around the image forming apparatus; and
prohibiting a shift of the power state from the second power state to the first power state based on the human sensor, during a predetermined period after the user interface receives the user operation.

15. The control method according to claim 14,
wherein the prohibiting is prohibiting a shift of the power state from the second power state to the first power state based on the human sensor during the predetermined period in a period after the user interface receives the user operation before the detection result of the human sensor indicates a non-detection.

16. The control method according to claim 14,
wherein the prohibiting is prohibiting a shift of the power state from the second power state to the first power state based on one or more signals output from the human sensor during the predetermined period.

17. The control method according to claim 14, further comprising:
shifting the power state from the second power state to the first power state based on the user operation received by the user interface after the prohibiting.

18. The control method according to claim 14,
wherein the prohibiting is stopping one or more signals output from the human sensor during the predetermined period.

19. The control method according to claim 14, further comprising:
stopping the prohibiting based on one or more signals output from the human sensor.

20. The control method according to claim 19,
wherein the stopping is stopping the prohibiting in a case where the one or more signals output from the human sensor indicates a non-detection.

21. The control method according to claim 14, further comprising:
enabling the human sensor to detect a human based on detection of a human by an another human sensor which has a wider detecting range than a detecting range of the human sensor.

22. The control method according to claim 14,
wherein the human sensor is an array sensor in which sensor elements configured to receive infrared light are arranged in a matrix.

23. The control method according to claim 14,
wherein the human sensor is a pyroelectric sensor.

24. The control method according to claim 14, further comprising:
printing an image on a sheet.

* * * * *